United States Patent [19]
Yamada et al.

[11] Patent Number: 5,583,698
[45] Date of Patent: Dec. 10, 1996

[54] ASPHERICAL ZOOM LENS

[75] Inventors: Katsu Yamada, Matsubara; Shusuke Ono, Takatsuki; Tsuyoshi Kakimoto, Katano, all of Japan

[73] Assignee: Matsushita Electric Industrial Co., Ltd., Osaka, Japan

[21] Appl. No.: 255,069

[22] Filed: Jun. 7, 1994

[30] Foreign Application Priority Data

Jun. 7, 1993 [JP] Japan .................................. 5-135016
Dec. 29, 1993 [JP] Japan .................................. 5-349868

[51] Int. Cl.$^6$ .................................................. G02B 15/14
[52] U.S. Cl. .................................................. 359/687
[58] Field of Search .................................. 359/683, 687

[56] References Cited

U.S. PATENT DOCUMENTS

| | | | |
|---|---|---|---|
| 4,859,042 | 8/1989 | Tanaka | 350/423 |
| 5,100,223 | 3/1992 | Ono et al. | 359/683 |
| 5,235,466 | 8/1993 | Ono et al. | 359/684 |
| 5,267,082 | 11/1993 | Ono et al. | 359/684 |
| 5,296,969 | 3/1994 | Mihara | 359/687 |

FOREIGN PATENT DOCUMENTS

| | | |
|---|---|---|
| 0405532 | 1/1991 | European Pat. Off. . |
| 0405856 | 1/1991 | European Pat. Off. . |
| 0493261 | 7/1992 | European Pat. Off. . |
| 0531925 | 3/1993 | European Pat. Off. . |
| 2-53017 | 2/1990 | Japan . |

OTHER PUBLICATIONS

EPO Search Report (94108737.1) dated Oct. 7, 1994.

*Primary Examiner*—Georgia Y. Epps
*Assistant Examiner*—Dawn-Marie Bey
*Attorney, Agent, or Firm*—Ratner & Prestia

[57] ABSTRACT

The aspherical zoom lens of the invention includes sequentially from an object side: a first lens group which has a positive refractive power and is fixed relative to an image plane; a second lens group which has a negative refractive power and is movable on an optical axis of the aspherical zoom lens so as to have a magnification changing function; a third lens group which has a positive refractive power and is fixed relative to the image plane so as to have a light converging function; and a fourth lens group which has a positive refractive power and is movable on the optical axis so that the image plane displaceable in response to travel of the second lens group and movement of the object is fixed at a position spaced by a predetermined distance from a reference face. An air space is provided between the third and the fourth lens groups. When viewed sequentially from the object side, the first lens group includes a negative lens, a positive lens and a meniscus positive lens, the second lens group includes a meniscus negative lens, a double concave lens and a positive lens, the third lens group includes a single lens having at least one aspherical face and the fourth lens group includes a cemented doublet and a positive lens, at least one of which has at least one aspherical face.

4 Claims, 35 Drawing Sheets

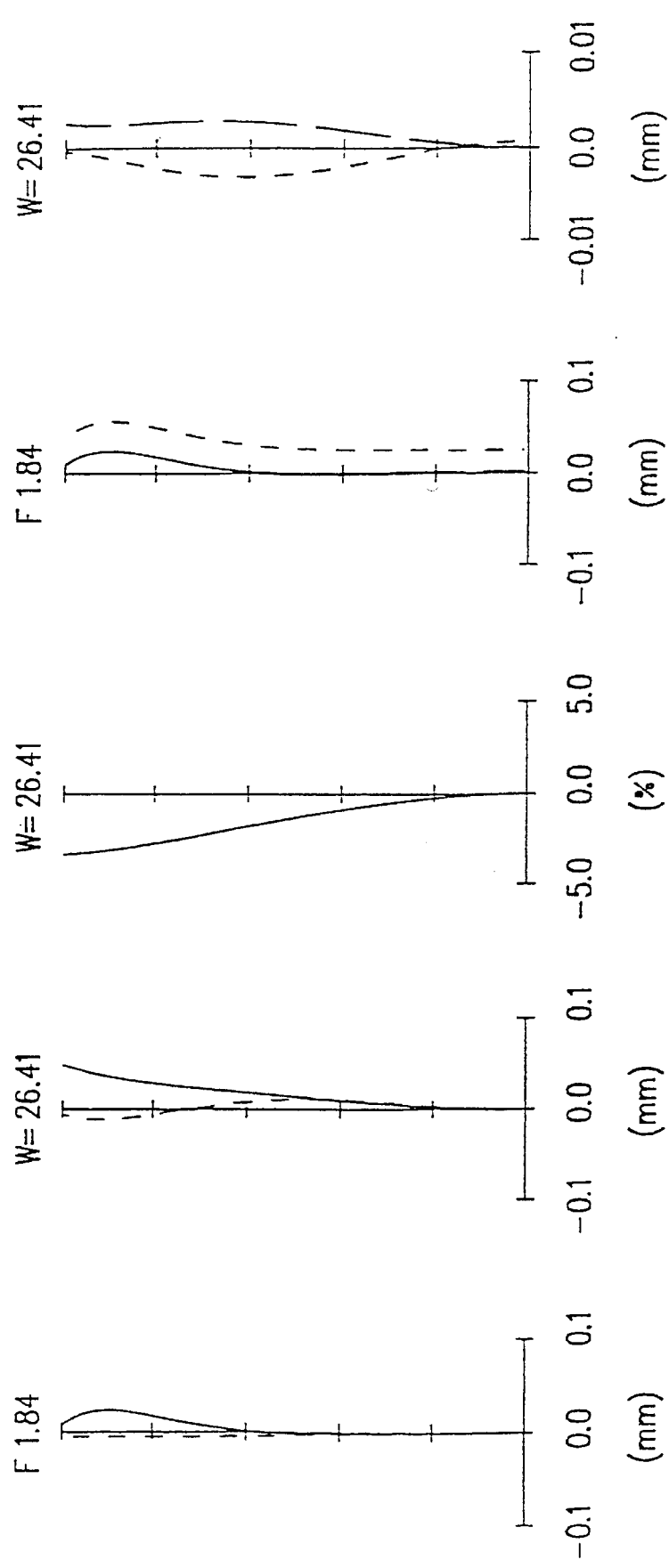

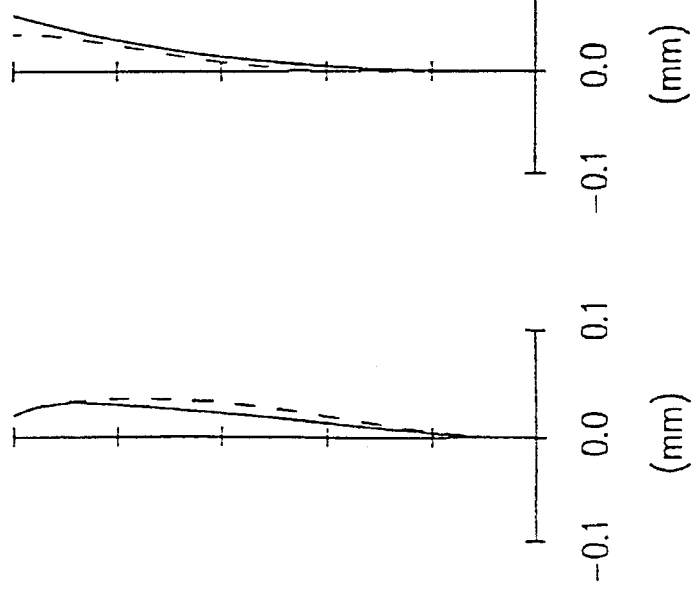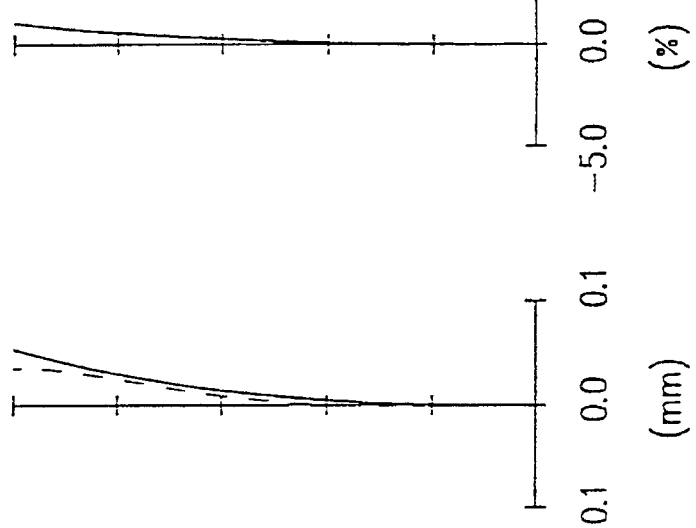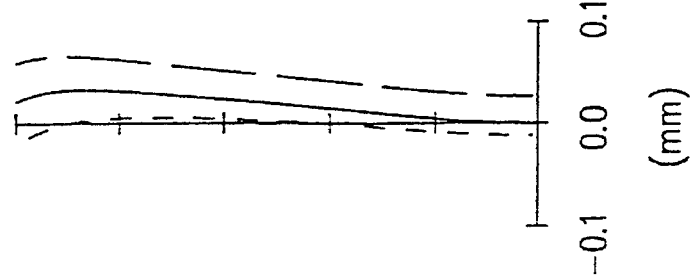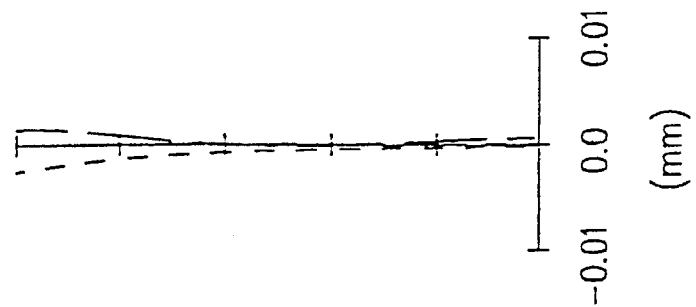

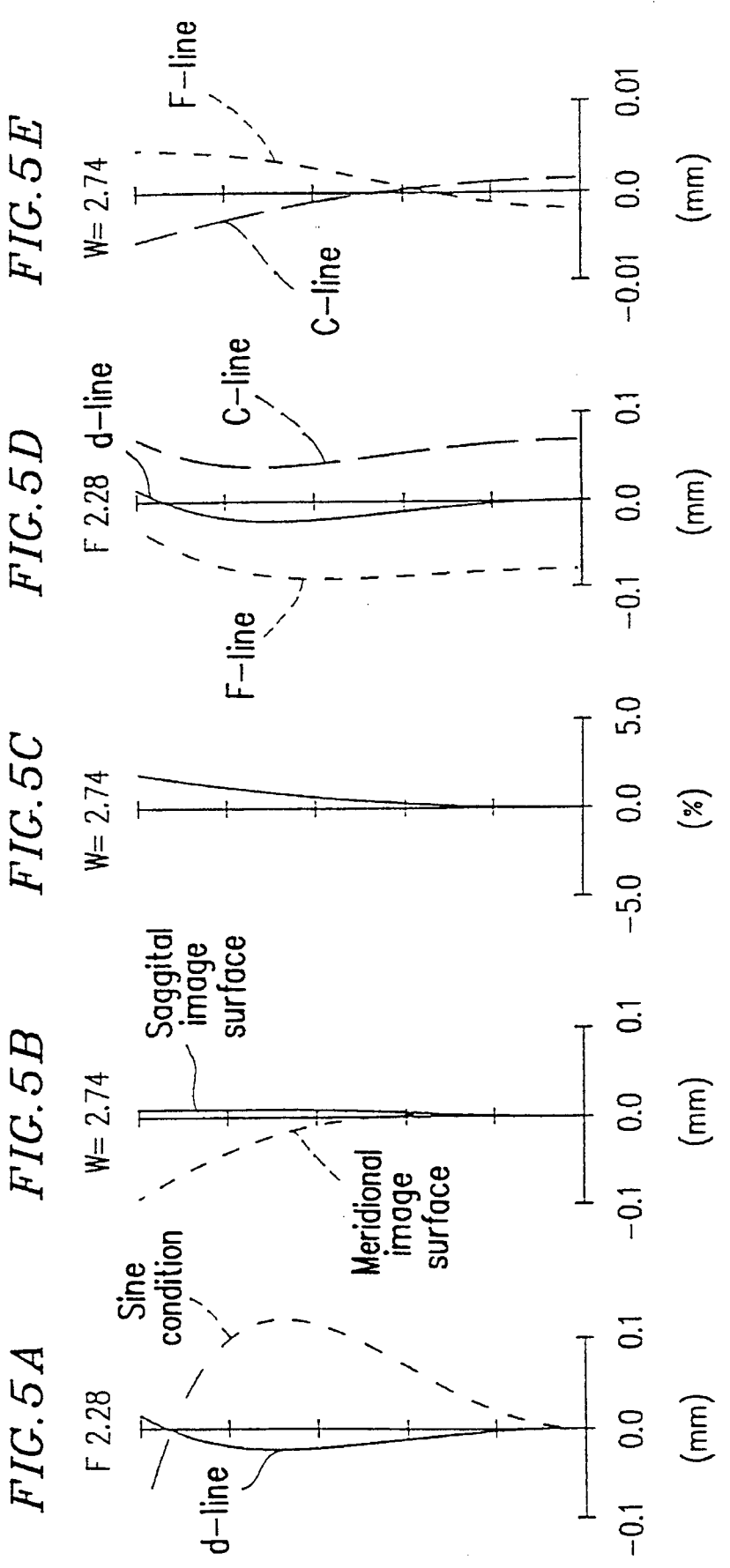

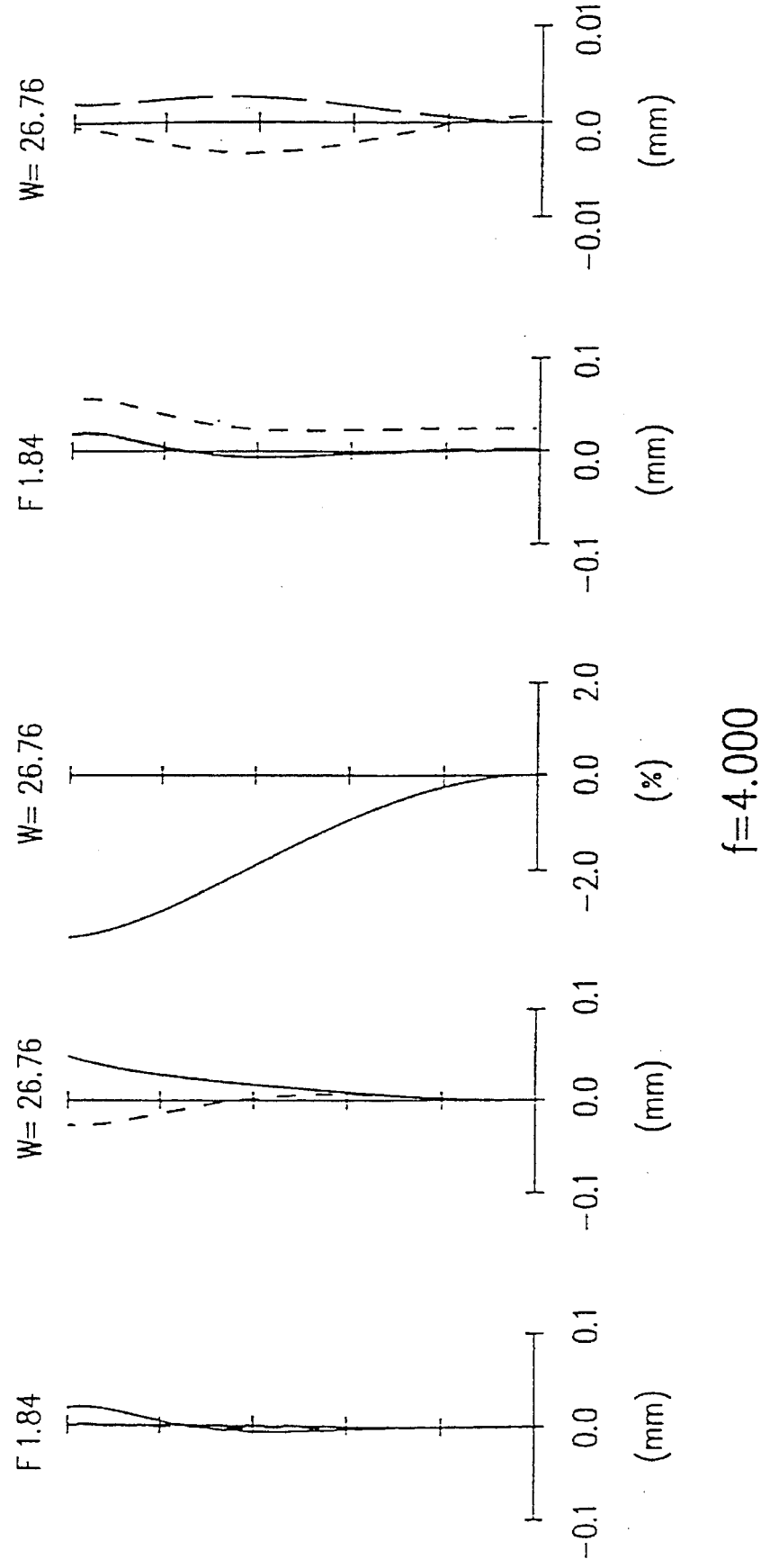

f=20.429

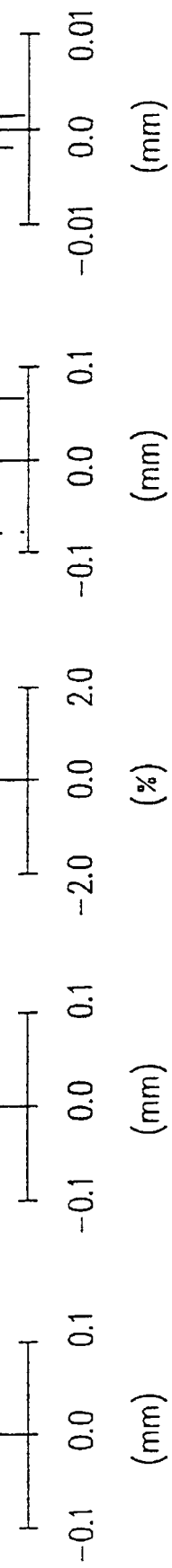
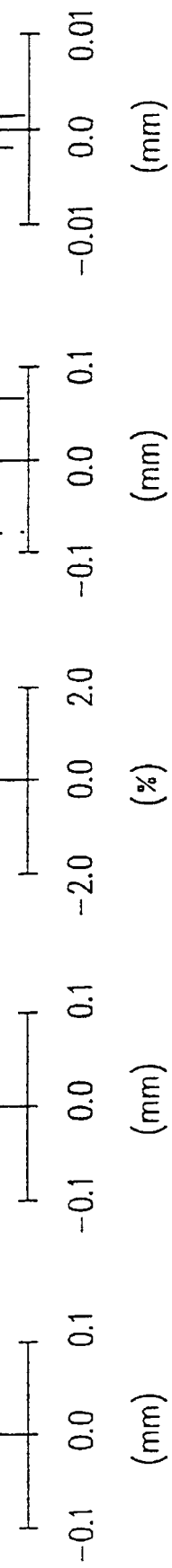
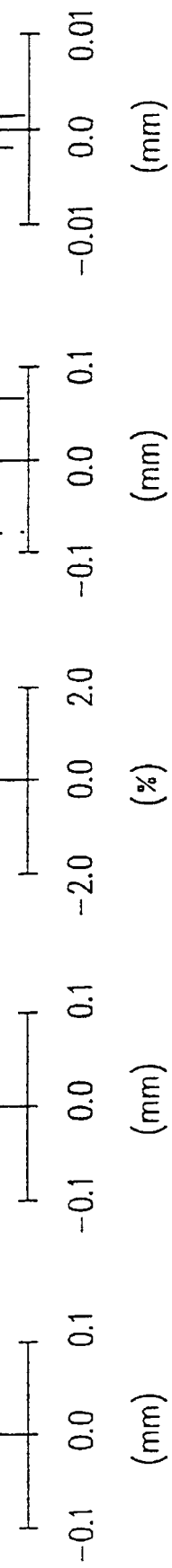
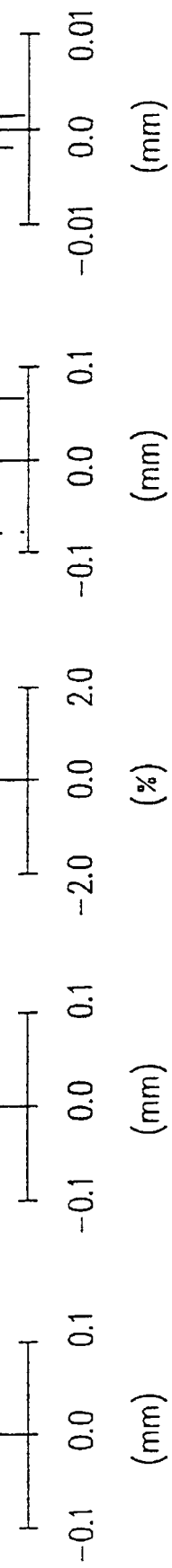
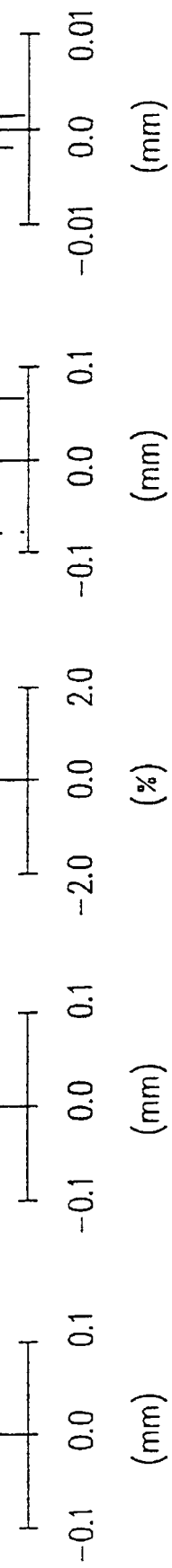
f=39.751 f = 4.407

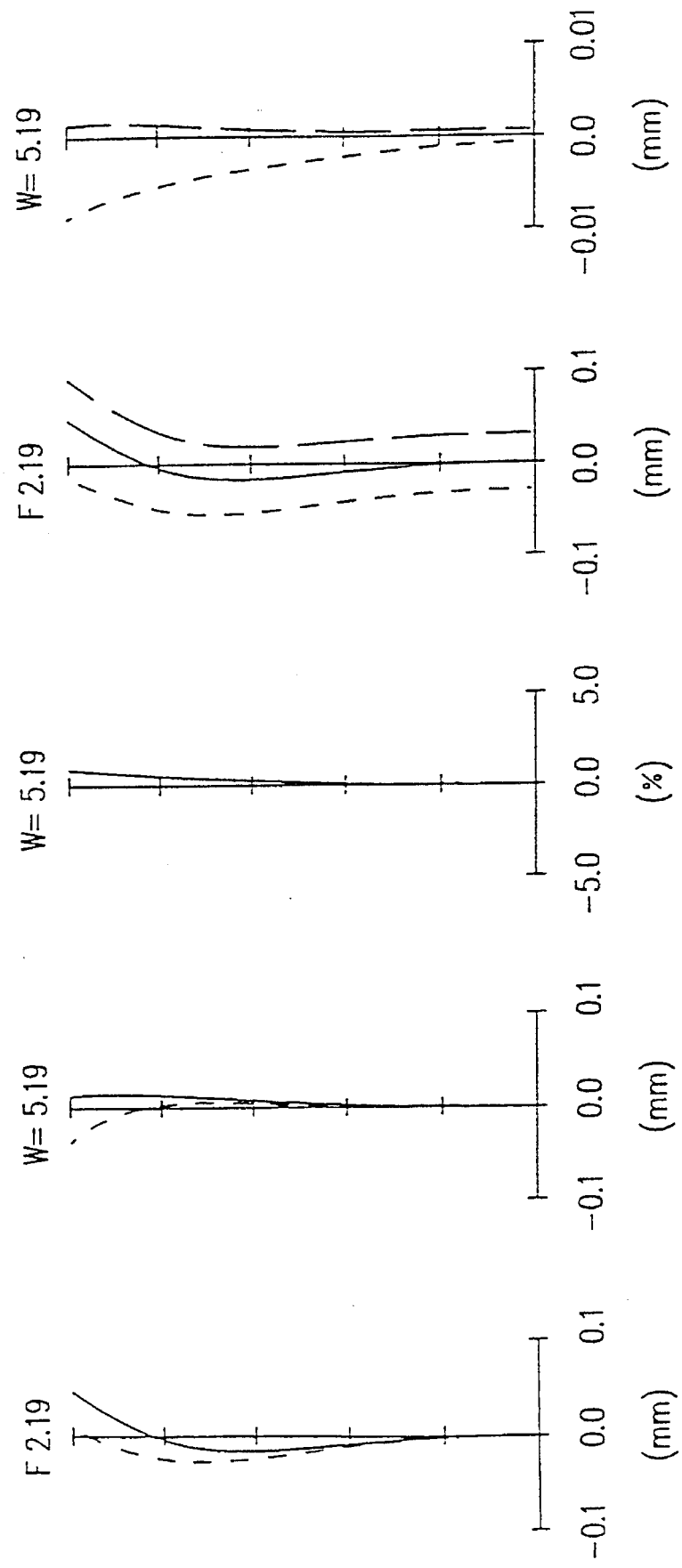

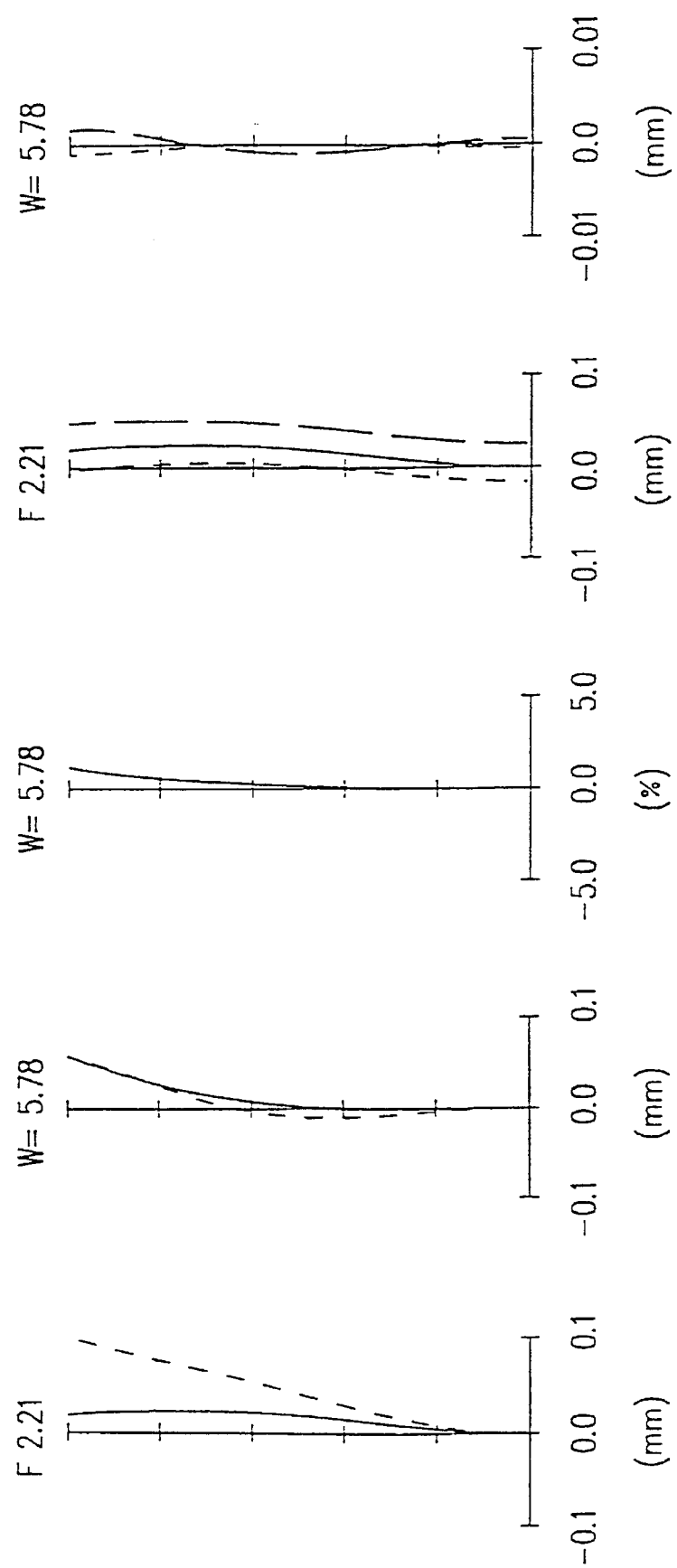

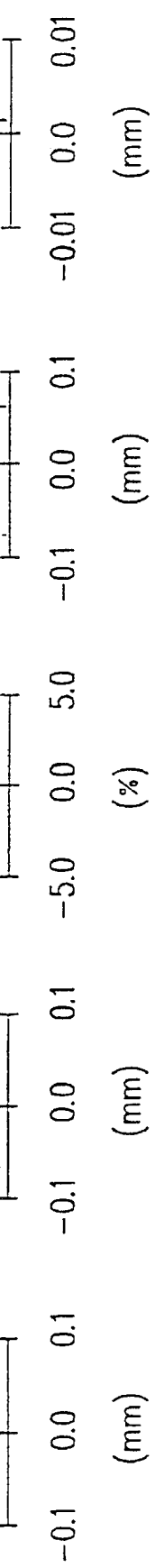

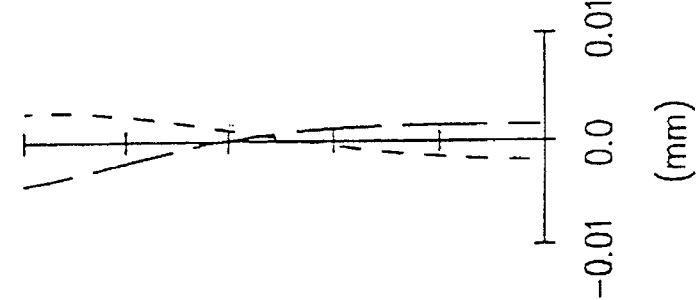
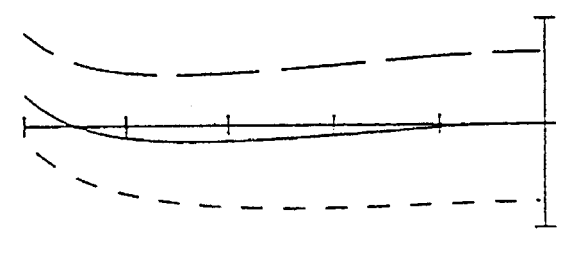
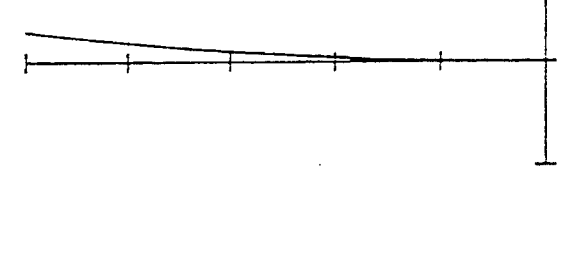
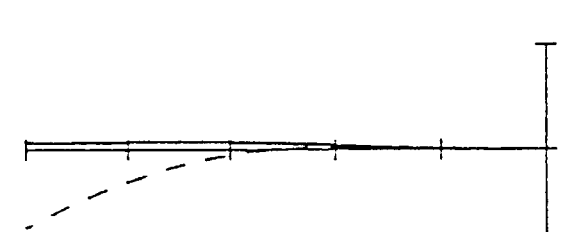
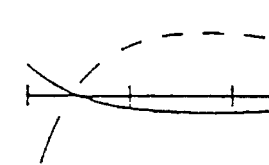
$f = 44.798$

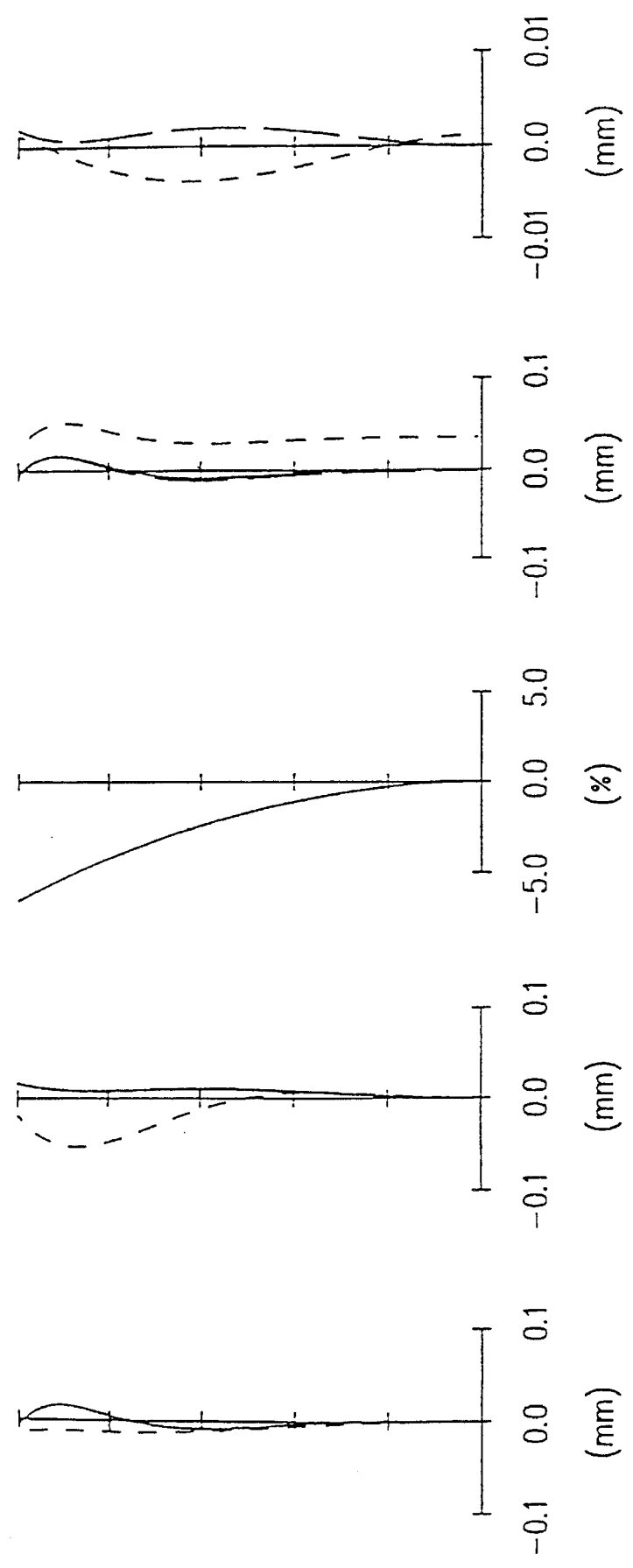

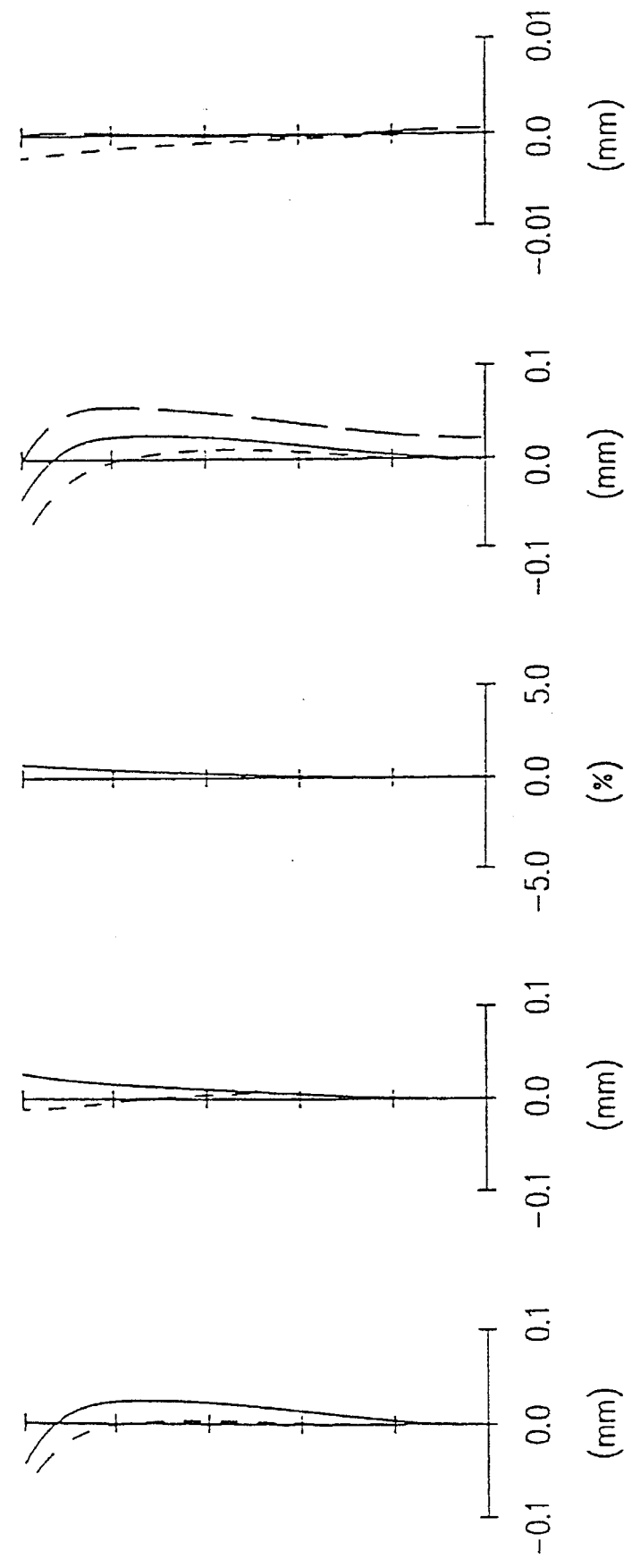

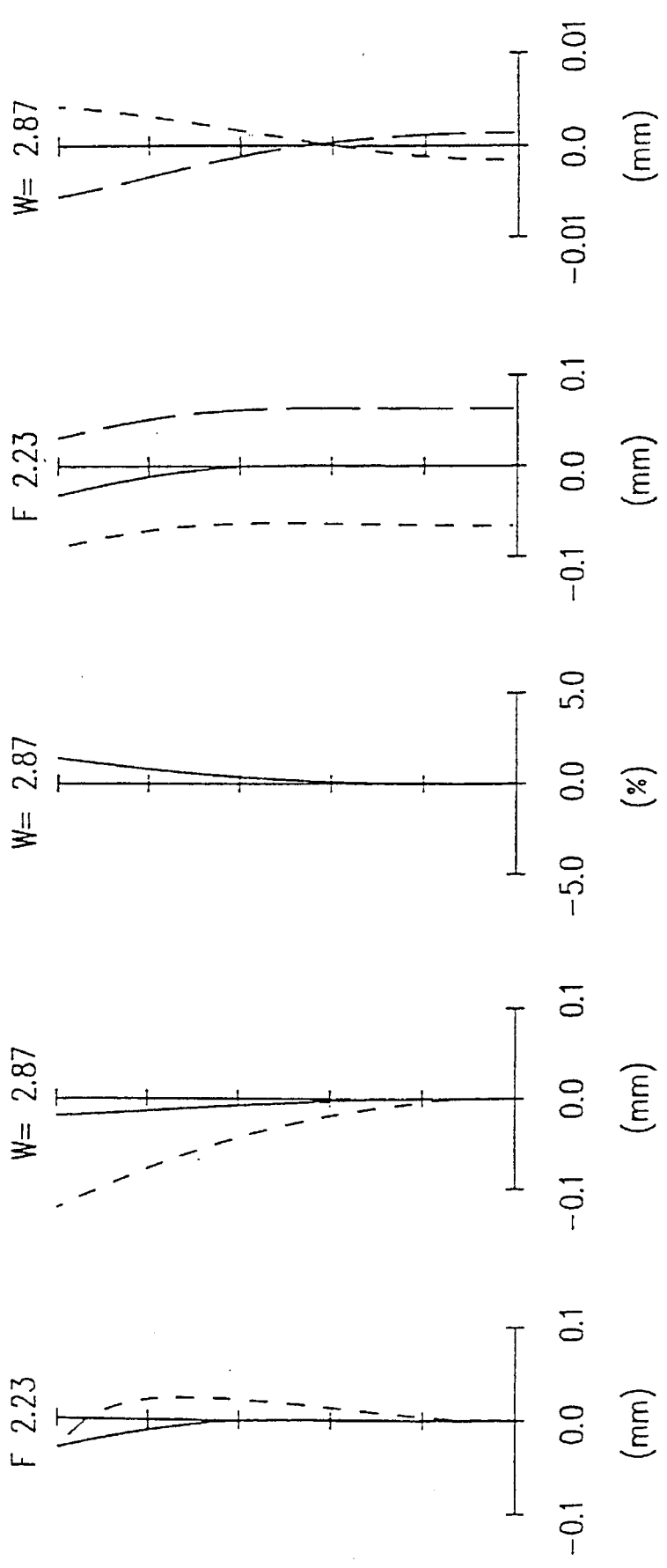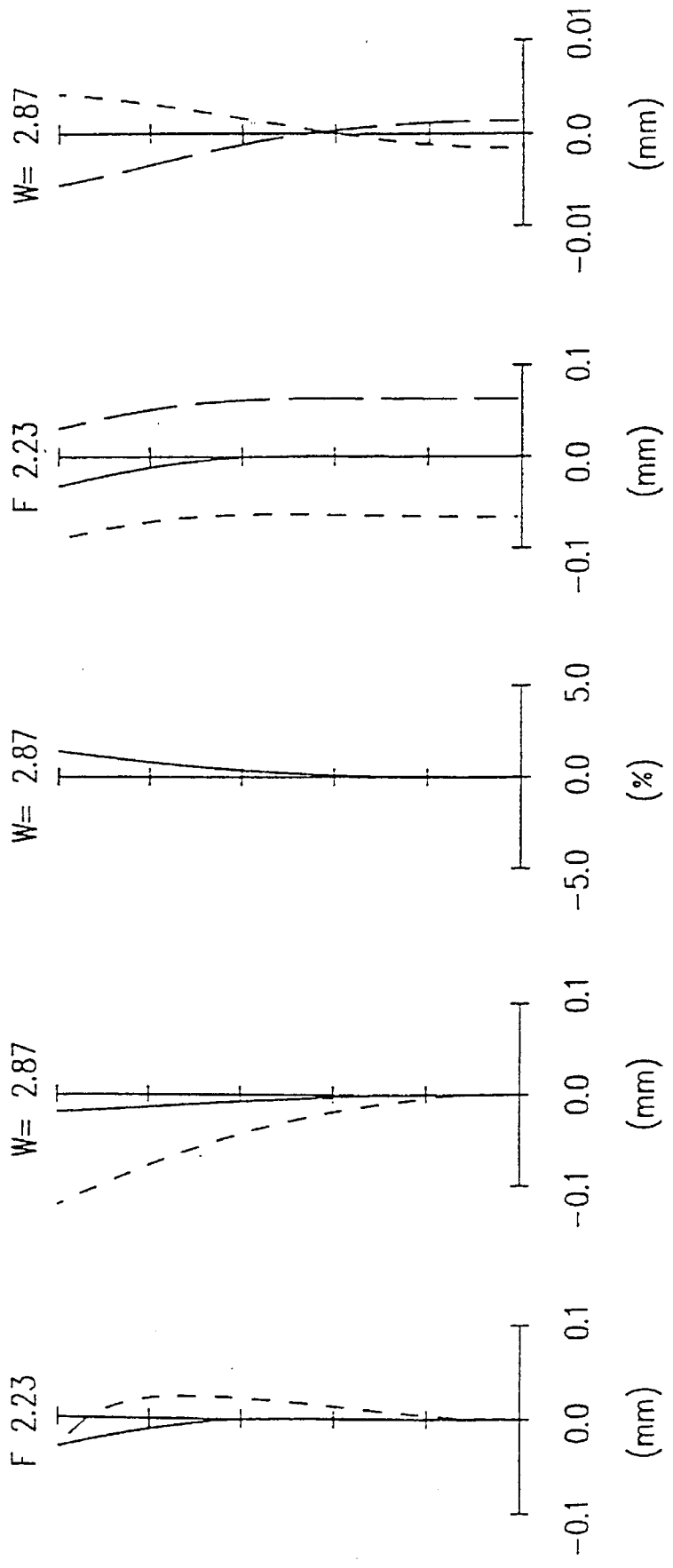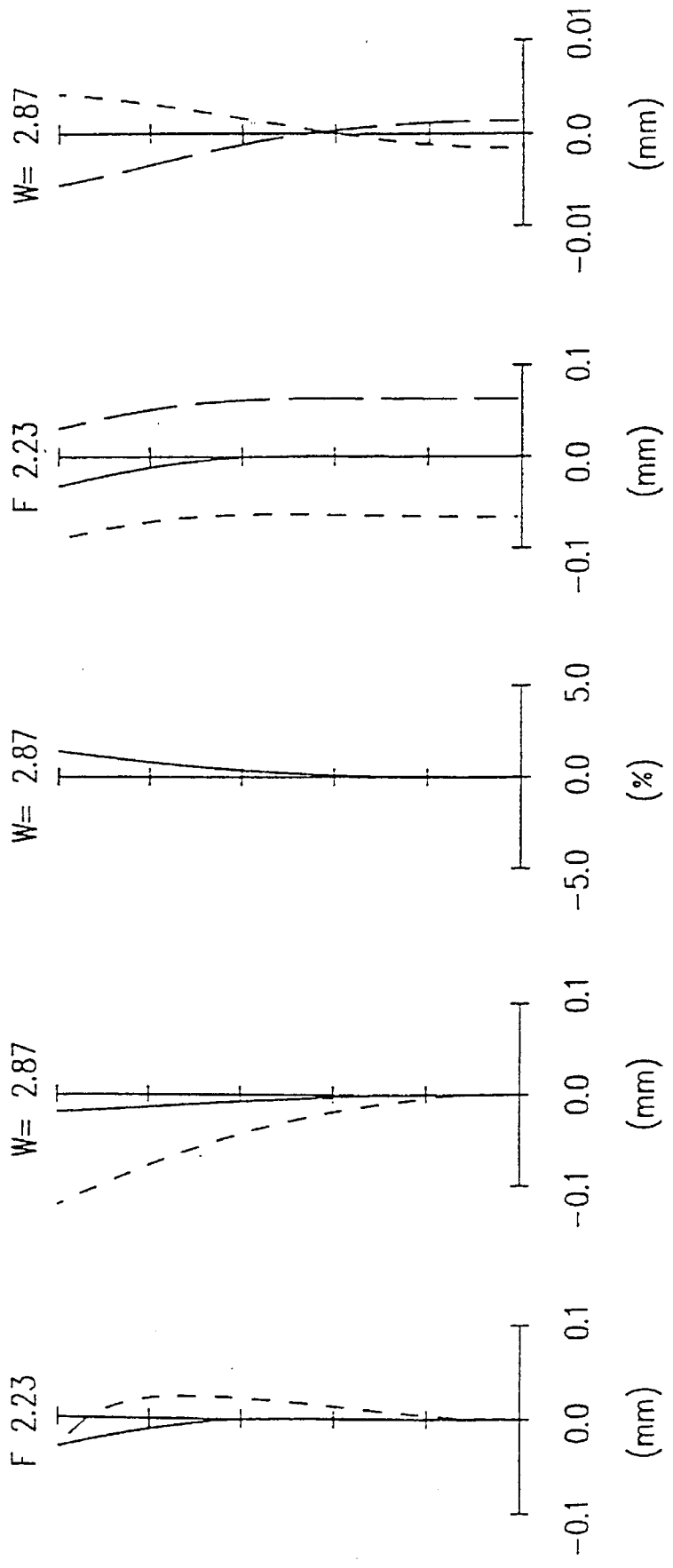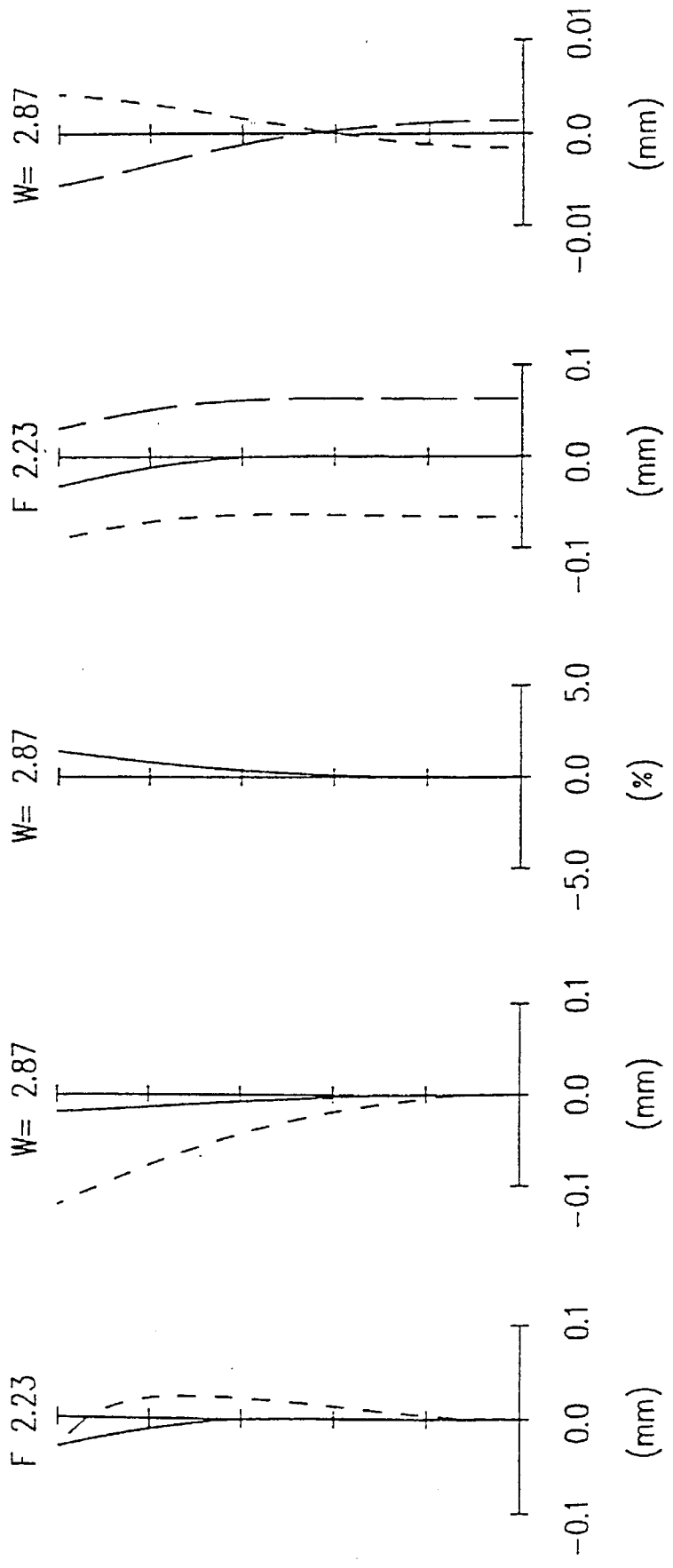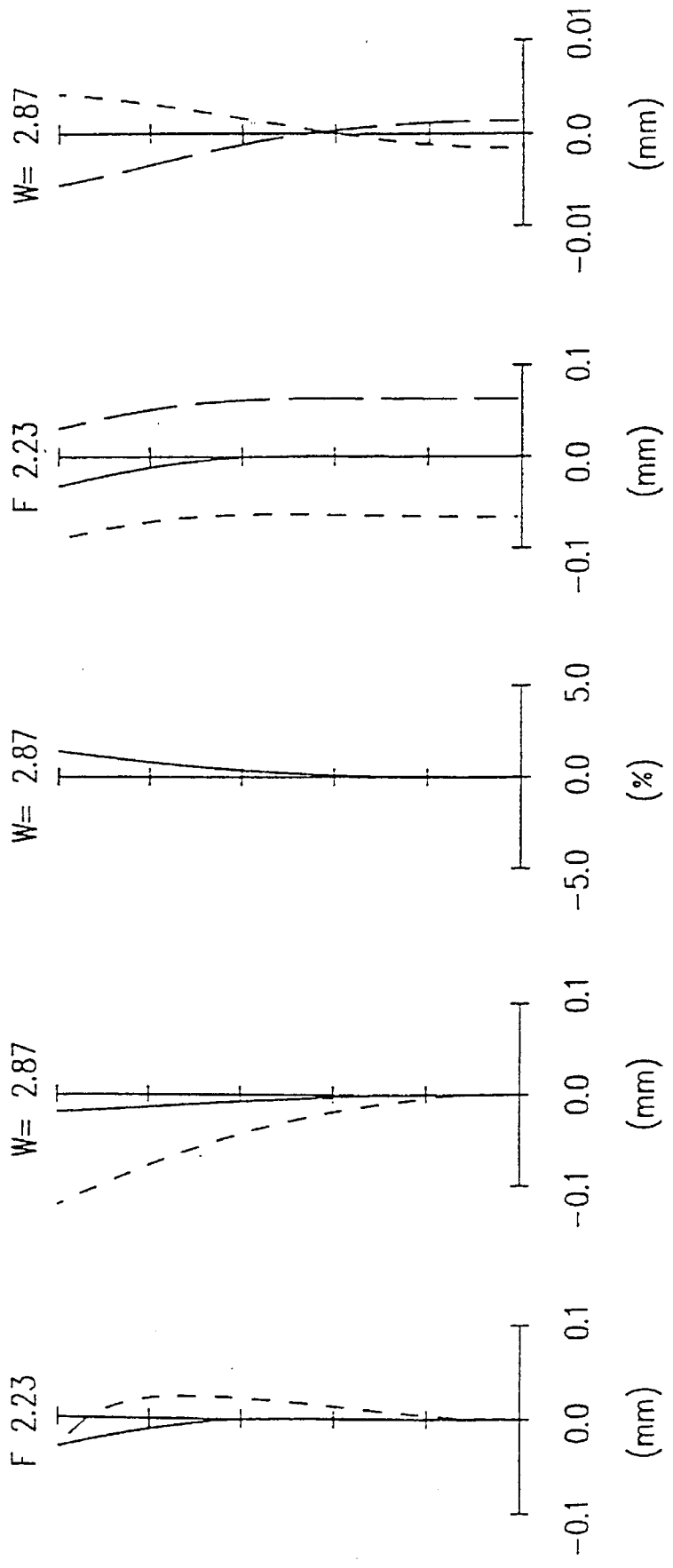

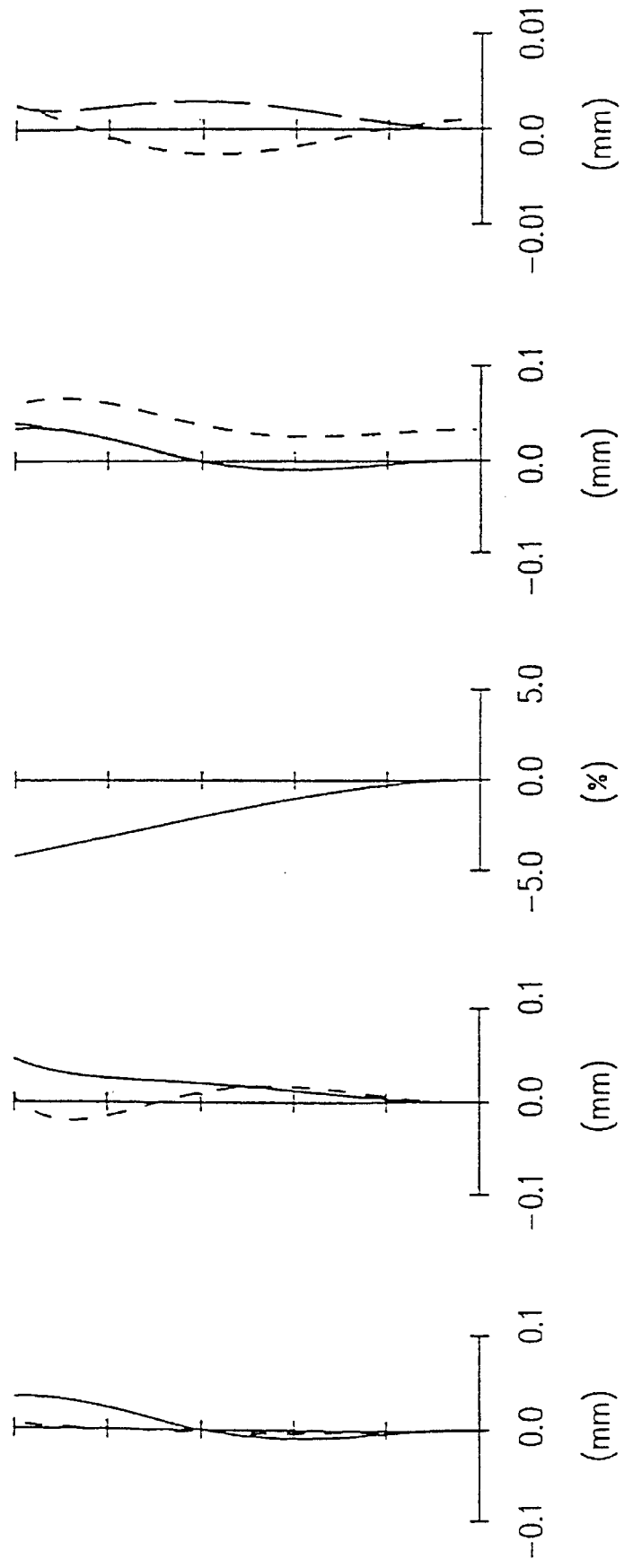

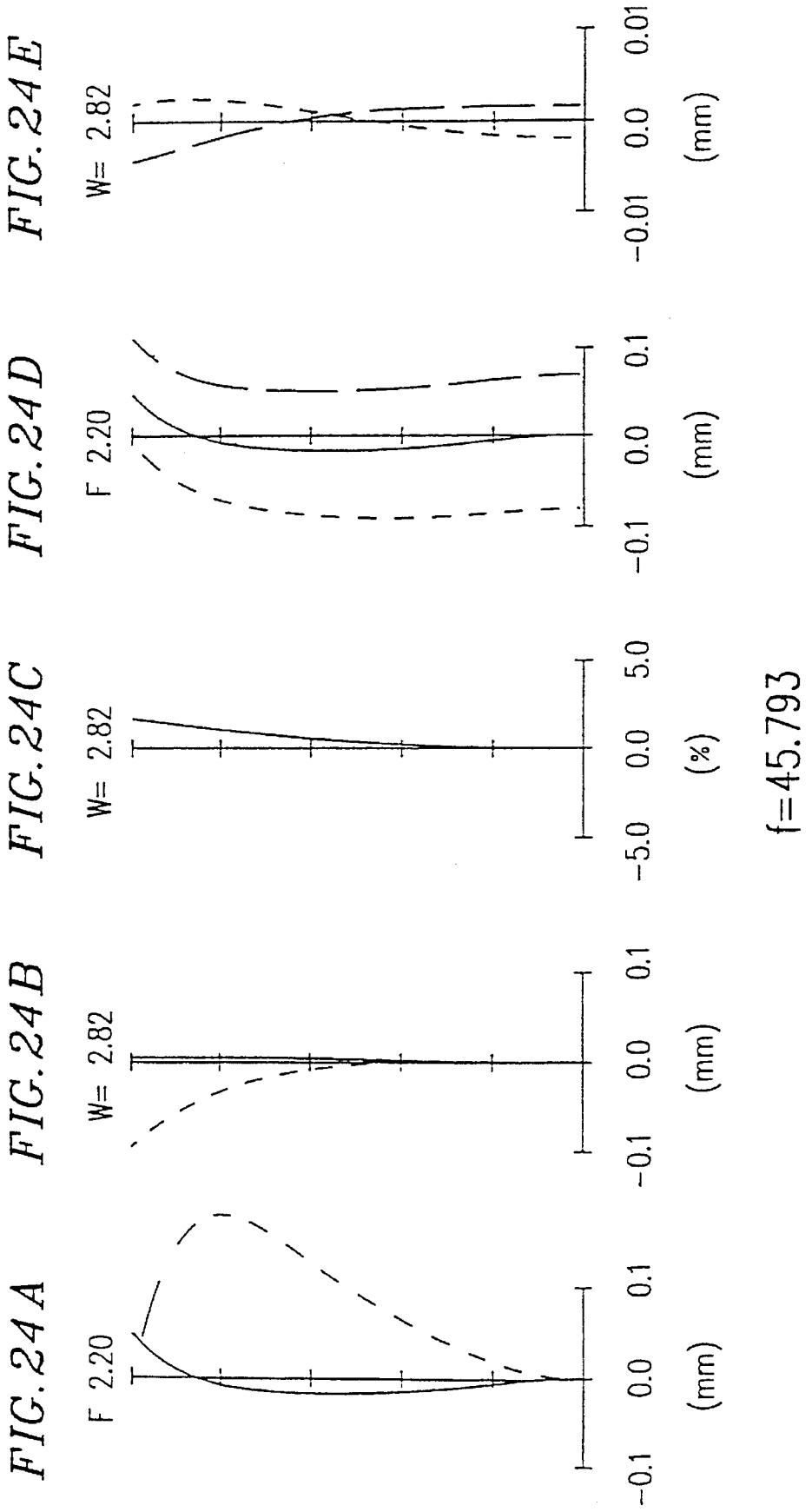

f=4.042

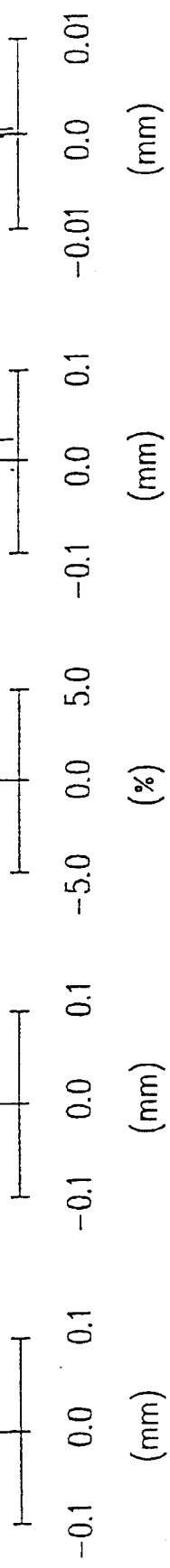

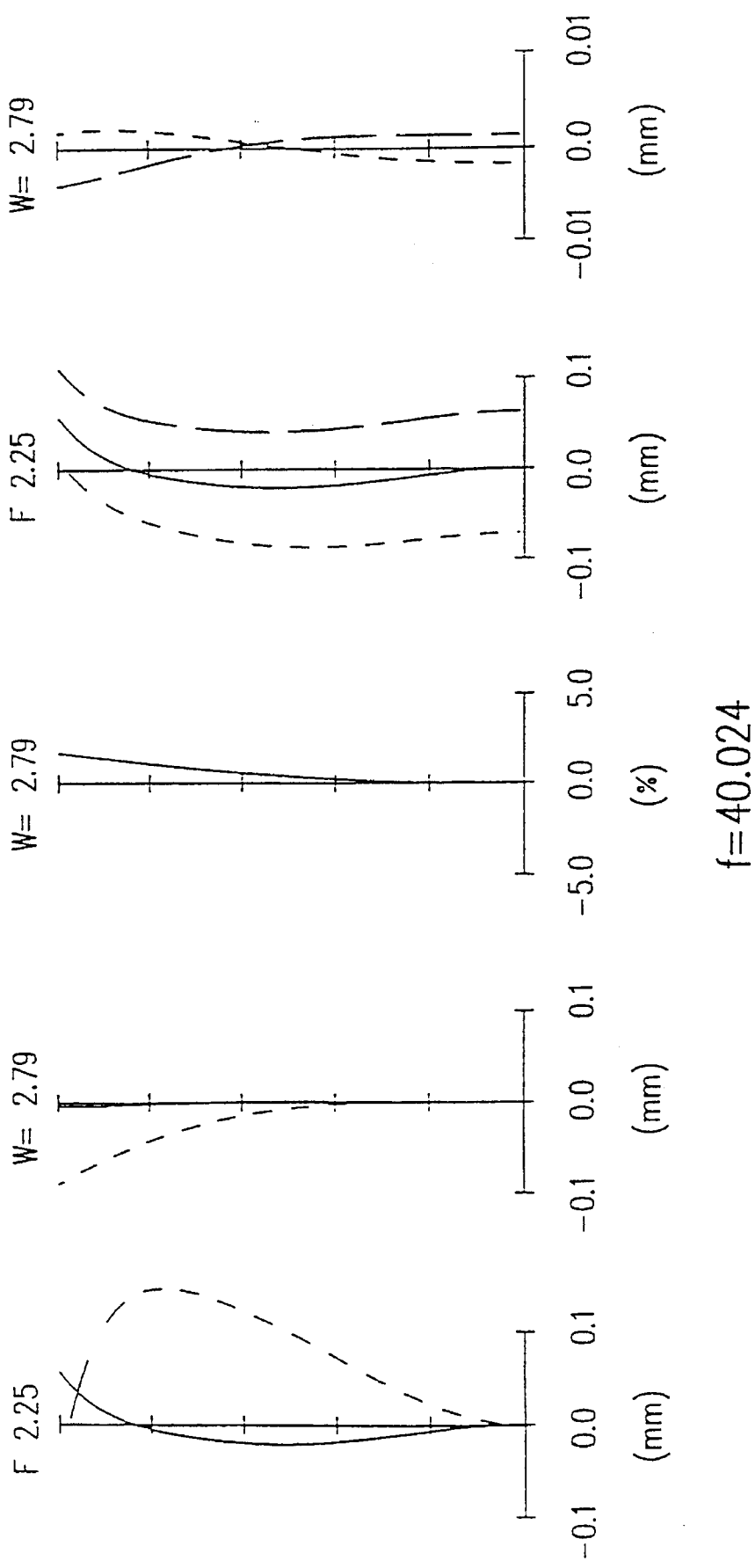

f=4.010

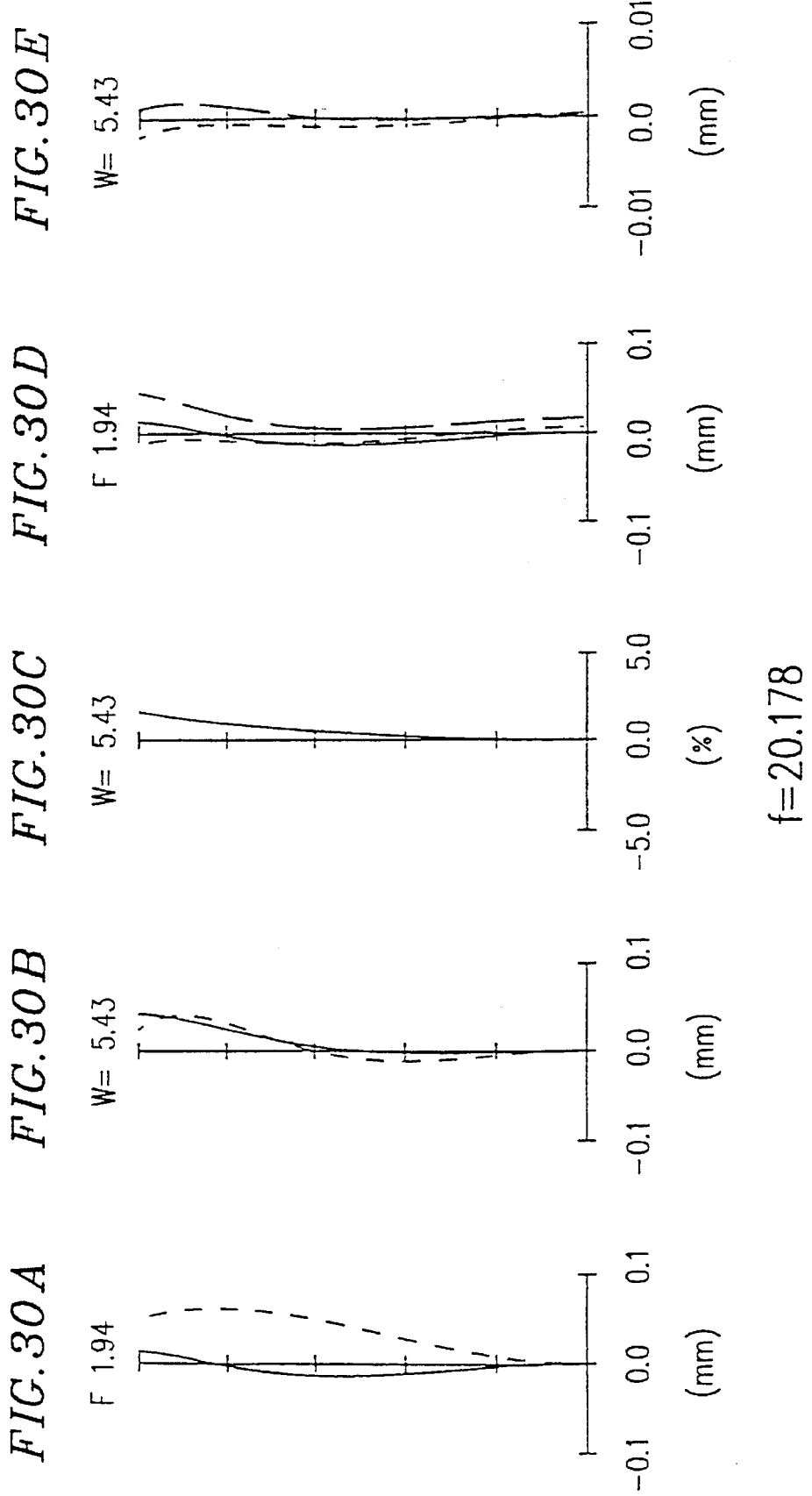

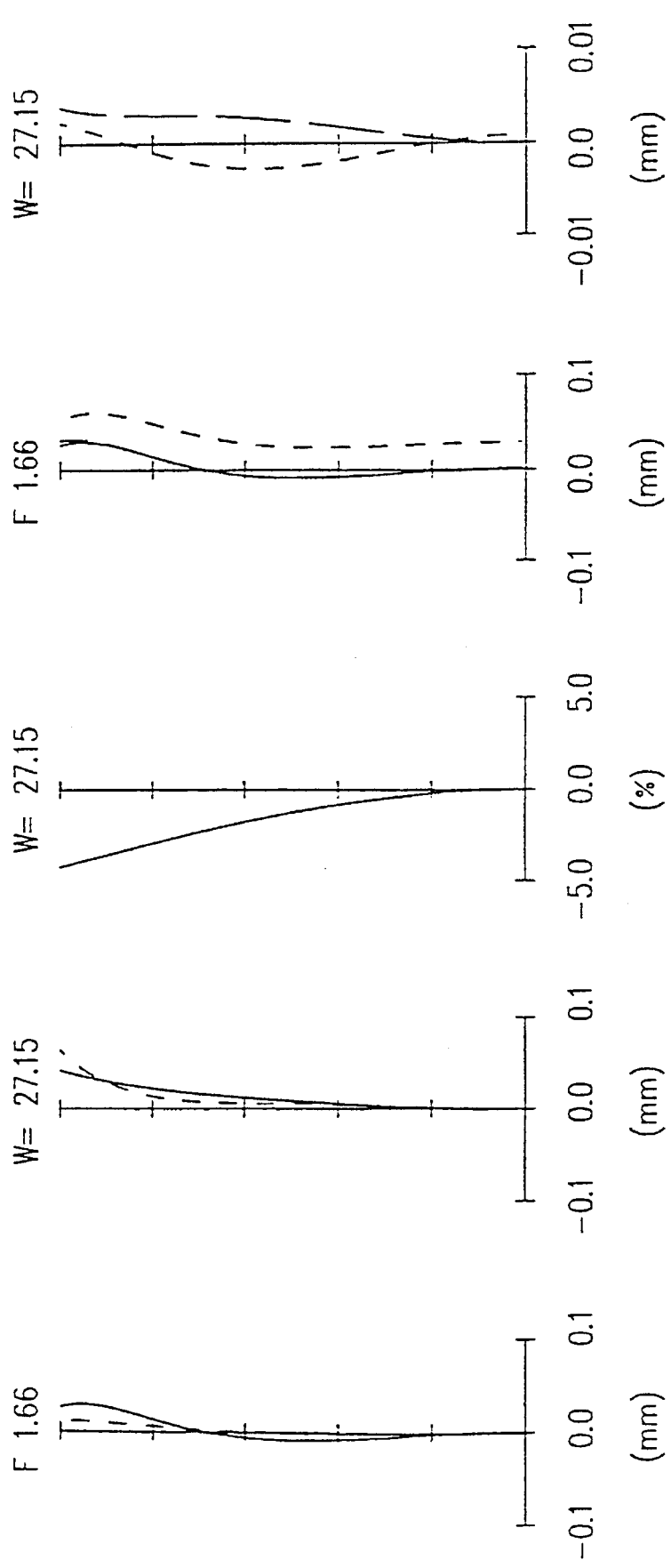
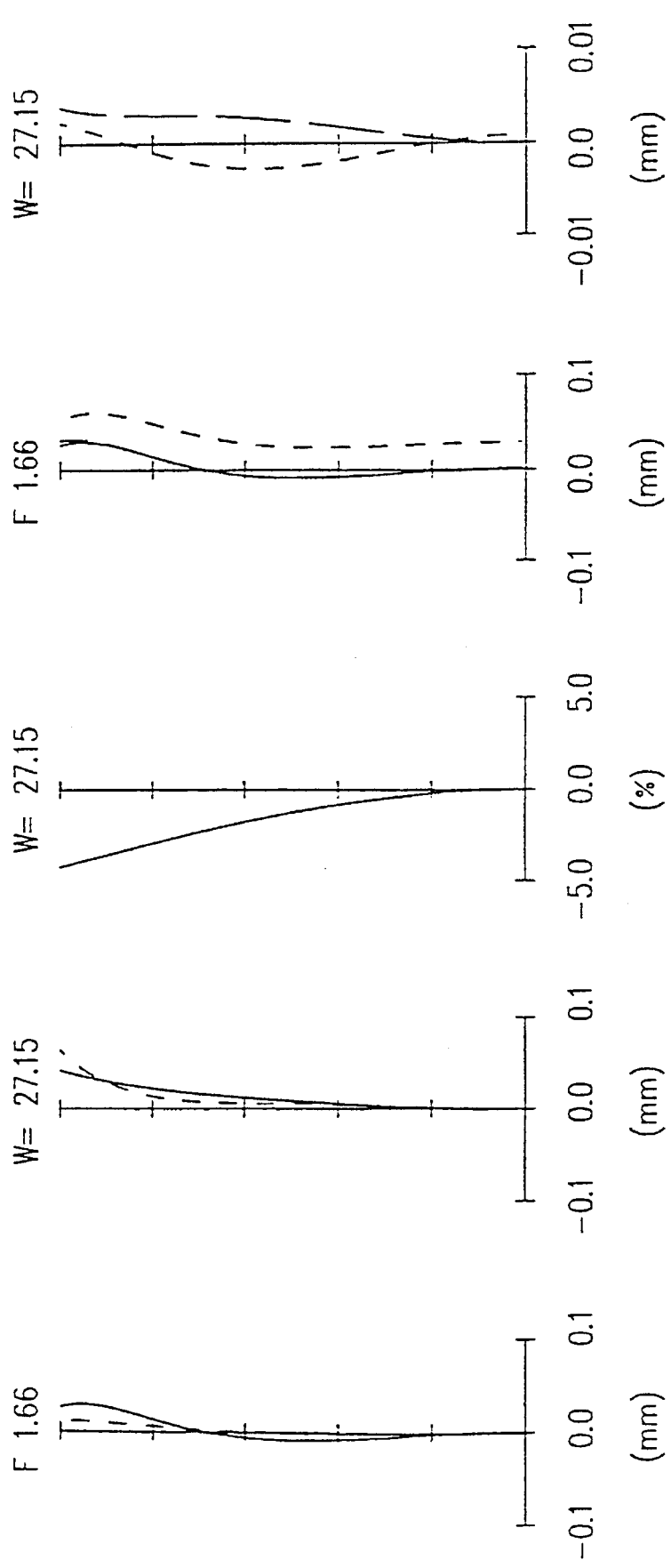
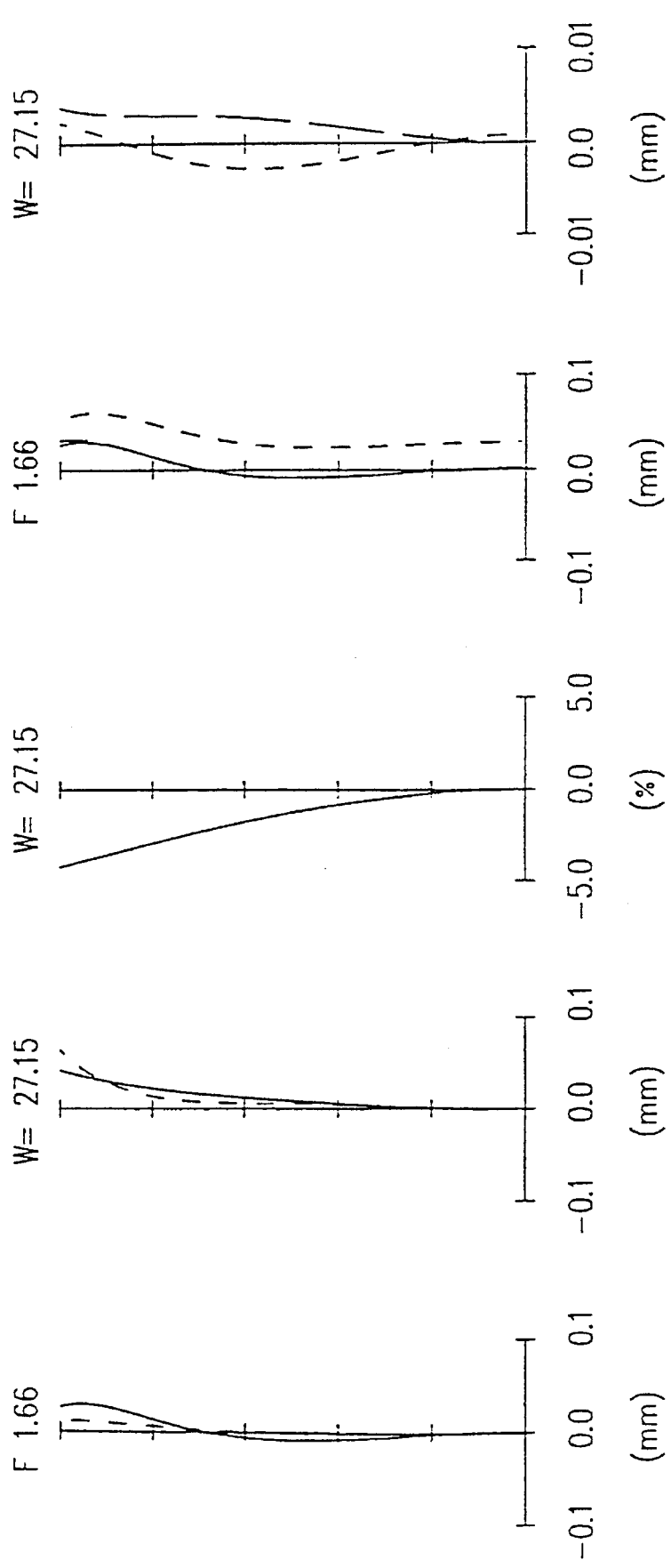
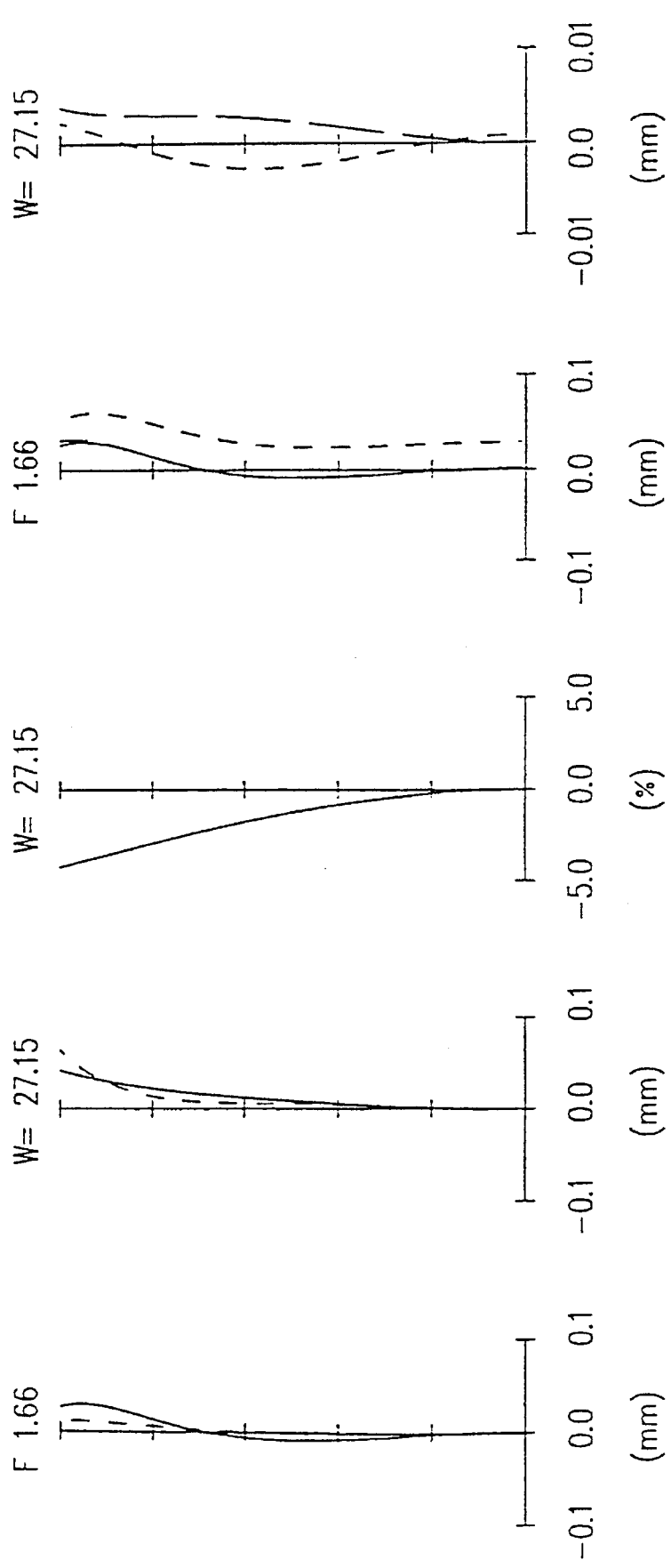
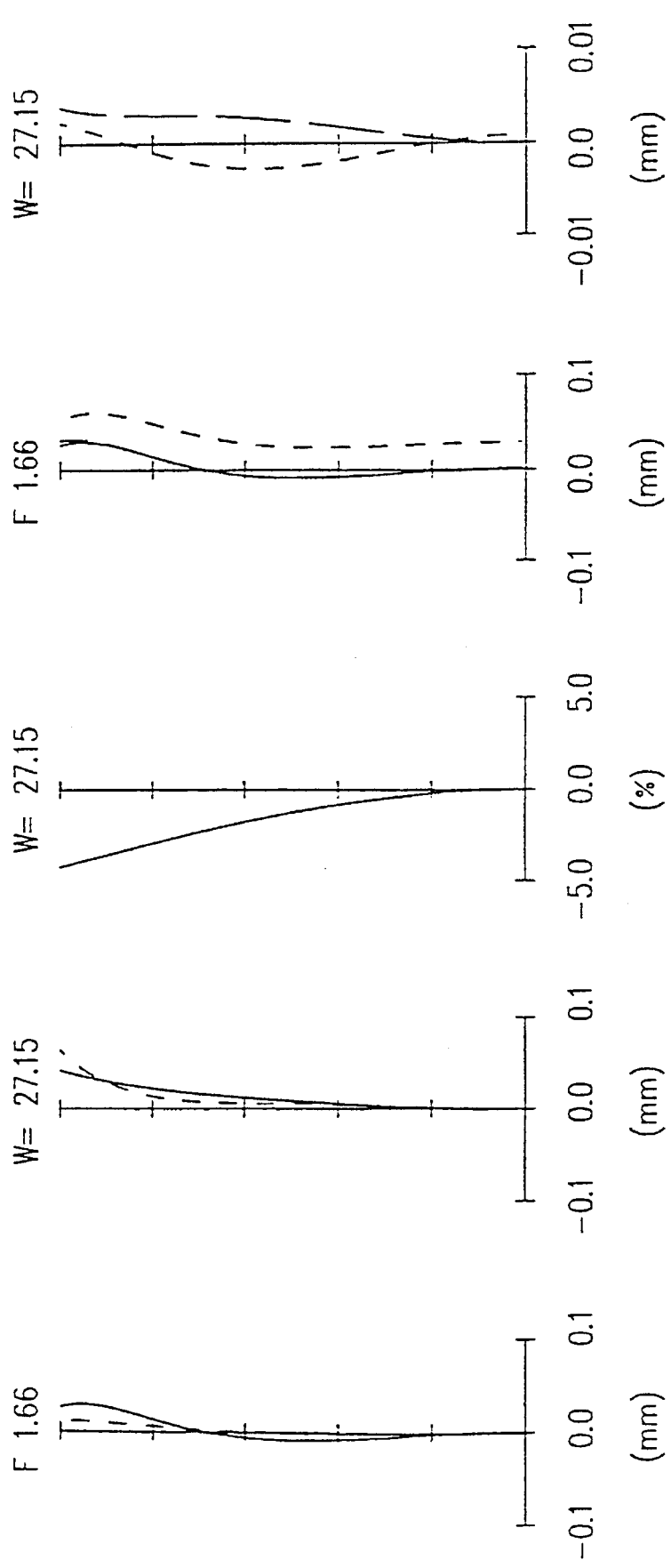

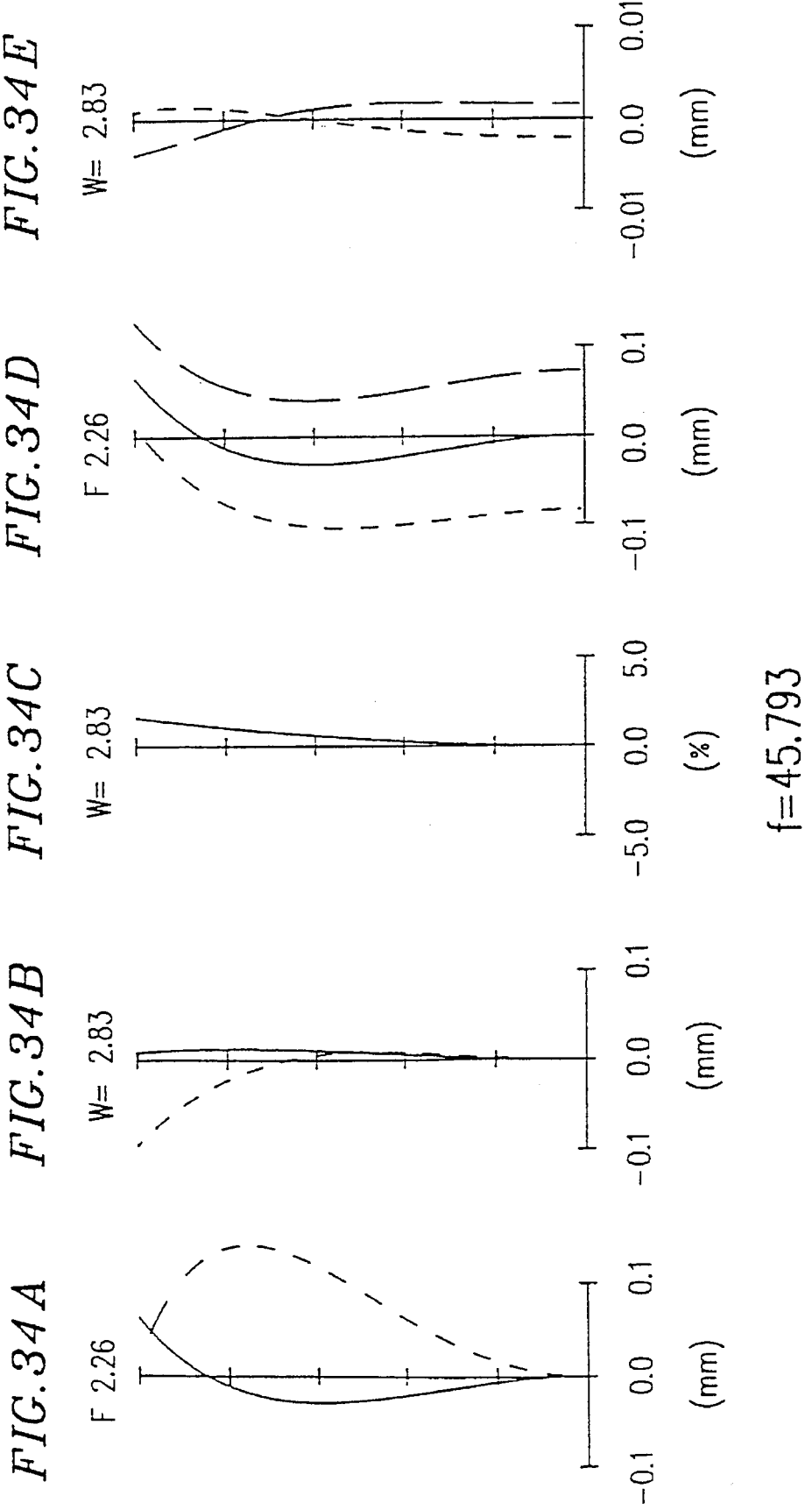

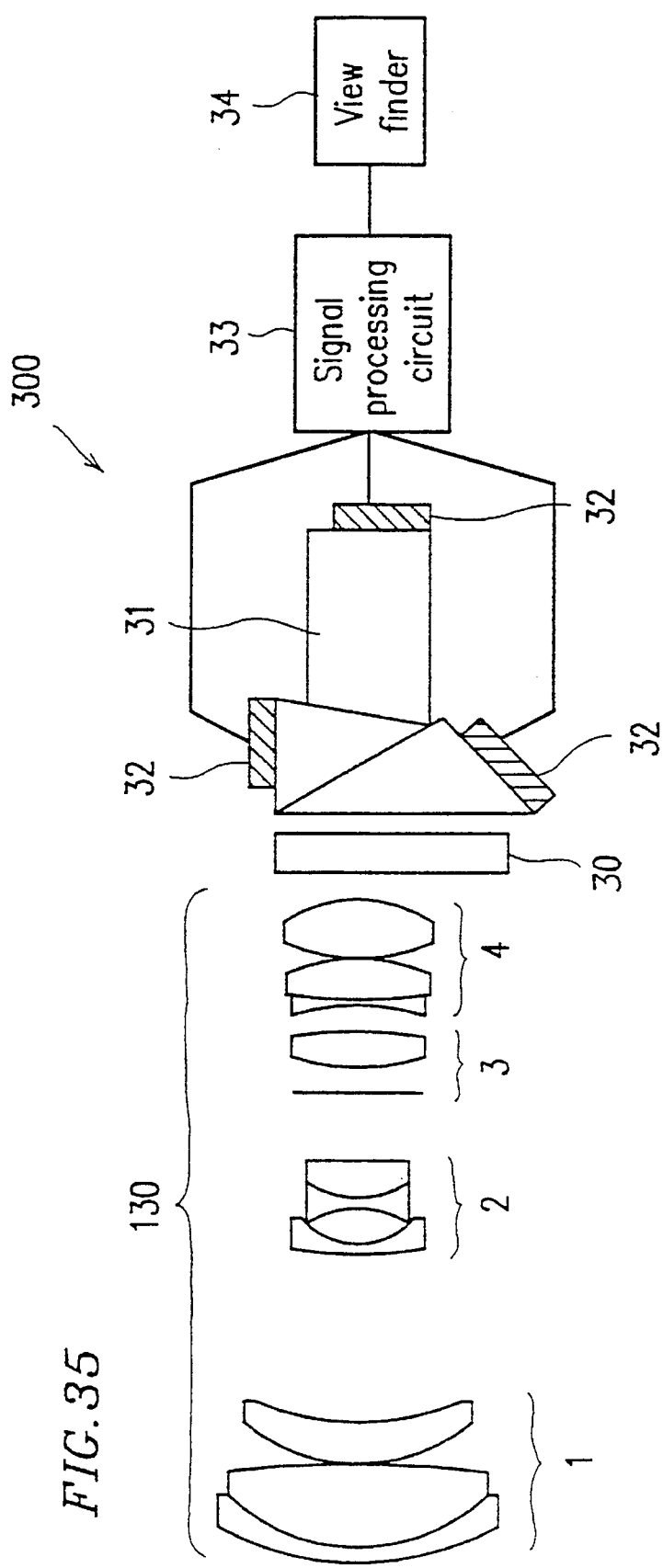

ASPHERICAL ZOOM LENS

BACKGROUND OF THE INVENTION

1. Field of the Invention

The present invention relates to an aspherical zoom lens. More particularly, the present invention relates to a high-performance aspherical zoom lens for use in a 3-CCD (charge coupled device) type video camera or the like, which has a high zoom ratio and a long back focal distance.

2. Description of the Related Art

In response to recent demands for excellent operational efficiency, good mobility and high image quality in video cameras, high-resolution and compact imaging devices are becoming a mainstream of imaging devices. Meanwhile, in this connection, high-performance and high-magnification zoom lenses which have a large aperture ratio, are compact in size and light in weight are in strong demand. Furthermore, due to a big demand for the reduction of production costs of zoom lenses, high-performance and high-magnification zoom lenses in which the number of lens components is reduced are in urgent need.

However, in known high-magnification zoom lenses, not only the diameters and overall length of lenses become large in order to realize the high magnification, but a large number of lenses are required to be used for performing more strict aberration corrections. As a result, conventional video cameras including the zoom lenses become larger, heavier, and more expensive and therefore, the zoom lenses have not been suitable for use in video cameras for home use.

Hereinafter, an exemplary zoom lens for use in a video camera is described with reference to FIG. 2 (for example, see Japanese Patent Application No. 3-232840).

FIG. 2 is a view showing the structure of a conventional zoom lens 200 for use in a video camera. As is shown in FIG. 2, the zoom lens 200 includes a first lens group 21 acting as a light converging portion, a second lens group 22 acting as a magnification changing portion, a third lens group 23 acting as a light converging portion, a fourth lens group 24 acting as a focusing portion, a color separation optical system 25, and a glass plate 26 which is optically equivalent to a quartz crystal filter, a face plate of an imaging device, and the like. The reference numeral 27 denotes an image plane.

The operation of the zoom lens 200 having the above-described arrangement is now described. The first lens group 21 is fixed at a predetermined position relative to the image plane 27, and has an image forming function. The second lens group 22 is movable on an optical axis so as to change magnification so that a focal length of an entire system is changed. The third lens group 23 is also fixed at a predetermined position relative to the image plane 27, and has a function of converging divergent light produced by the second lens group 22. The fourth lens group 24 is movable on the optical axis and has a focusing function. Variations in position of the image plane due to travel of the second lens group 22 at the time of zooming are eliminated by displacing the forth lens group 24. Thus, the image plane is fixed at a predetermined position.

In the above-described conventional zoom lens 200, the fourth lens group 24 consists of three single lenses. This results in a strict and narrow tolerance for the zoom lens system. Accordingly, in cases where inclination of lens occurs, or in other cases, it is difficult to maintain the performance of the zoom lens system. In addition, if the zoom ratio is set to about 10, and a back focal distance is ensured to be long in order to realize a high magnification, it becomes difficult to perform aberration correction over an entire zoom range and an entire shooting distance, so that high image quality cannot be achieved.

SUMMARY OF THE INVENTION

The aspherical zoom lens of this invention includes sequentially from an object side: a first lens group which has a positive refractive power and is fixed relative to an image plane; a second lens group which has a negative refractive power and is movable on an optical axis of the aspherical zoom lens so as to have a magnification changing function; a third lens group which has a positive refractive power and is fixed relative to the image plane so as to have a light converging function; and a fourth lens group which has a positive refractive power and is movable on the optical axis so that the image plane displaceable in response to travel of the second lens group and movement of the object is fixed at a position spaced by a predetermined distance from a reference face, wherein an air space is provided between the third and the fourth lens groups, and wherein when viewed sequentially from the object side, the first lens group includes a negative lens, a positive lens and a meniscus positive lens, the second lens group includes a meniscus negative lens, a double concave lens and a positive lens, the third lens group includes a single lens having at least one aspherical face and the fourth lens group includes a cemented doublet and a positive lens, at least one of which has at least one aspherical face.

In one embodiment of the invention, in the first lens group, the negative lens and the positive lens constitute a second cemented doublet, and in the second lens group, the double concave lens and the positive lens constitute a third cemented doublet.

In another embodiment of the invention, the third lens group comprises an aspherical single lens with positive refractive power having a convex face confronting the object.

In another embodiment of the invention, in the cemented doublet of the fourth lens group, when viewed sequentially from the object side, a negative lens and a positive lens are attached to each other, and the positive lens has a convex face confronting the image plane.

In another embodiment of the invention, the aspherical zoom lens satisfies the following conditions:

(1) $3.0<f1/fW<8.0$
(2) $0.5<|f2|/fW<1.6$
(3) $2.0<f3/fW<7.0$
(4) $2.0<f4/fW<5.0$
(5) $1.5<BF/fW<5.0$
(6) $0.02<d12/f4<1.0$
(7) $0.3<r11/f3<1.5$
(8) $0.3<|r13|/f4<3.0$
(9) $0.3<|r17|/f4<1.5$ where fW denotes a focal length of the aspherical zoom lens at a wide angle end, fi (i=1, 2, 3, and 4) denotes a focal length of an i-th lens group; BF denotes an air spatial distance from the last lens face to the image plane; d12 denotes the air space between the third and the fourth lens groups; r11 denotes a radius of curvature of a face of the positive lens of the third lens group, which face confronts the object; r13 denotes a radius of curvature of a face of the cemented doublet of the fourth lens group; and r17 denotes a radius of curvature of a face of the positive lens of the fourth lens group.

In another embodiment of the invention, the aspherical zoom lens satisfies the following conditions:

(1) $5.0 < f1/fW < 6.3$
(2) $0.9 < |f2|/fW < 1.2$
(3) $5.3 < f3/fW < 6.2$
(4) $3.0 < f4/fW < 3.3$
(5) $3.1 < BF/fW < 4.2$
(6) $0.1 < d12/f4 < 0.4$
(7) $0.5 < r11/f3 < 0.9$
(8) $1.1 < |r13|/f4 < 2.4$
(9) $0.6 < |r17|/f4 < 0.8$ where fW denotes a focal length of the aspherical zoom lens at a wide angle end, fi (i=1, 2, 3, and 4) denotes a focal length of an i-th lens group; BF denotes an air spatial distance from the last lens face to the image plane; d12 denotes the air space between the third and the fourth lens groups; r11 denotes a radius of curvature of a face of the positive lens of the third lens group, which face confronts the object; r13 denotes a radius of curvature of a face of the cemented doublet of the fourth lens group; and r17 denotes a radius of curvature of a face of the positive lens of the fourth lens group.

In another embodiment of the invention, at least one lens in the first lens group has at least one aspherical face.

In another embodiment of the invention, at least one lens in the second lens group has at least one aspherical face.

According to another aspect of the invention, a video camera is provided. The video camera includes: an aspherical zoom lens; a color separation optical system for separating light output from the aspherical zoom lens into respective R, G, and B wavelength bands; and a plurality of imaging devices for converting images in the respective R, G, and B wavelength bands which are separated by the color separation optical system into pixel signals. The aspherical zoom lens includes sequentially from an object side: a first lens group which has a positive refractive power and is fixed relative to an image plane; a second lens group which has a negative refractive power and is movable on an optical axis of the aspherical zoom lens so as to have a magnification changing function; a third lens group which has a positive refractive power and is fixed relative to the image plane so as to have a light converging function; and a fourth lens group which has a positive refractive power and is movable on the optical axis so that the image plane displaceable in response to travel of the second lens group and movement of the object is fixed at a position spaced by a predetermined distance from a reference face, wherein an air space is provided between the third and the fourth lens groups, wherein when viewed sequentially from the object side, the first lens group includes a negative lens, a positive lens and a meniscus positive lens, the second lens group includes a meniscus negative lens, a double concave lens and a positive lens, the third lens group includes a single lens having at least one aspherical face, and the fourth lens group includes a cemented doublet and a positive lens, at least one of which has at least one aspherical face. The aspherical zoom lens satisfies the following conditions:

(1) $3.0 < f1/fW < 8.0$
(2) $0.5 < |f2|/fW < 1.6$
(3) $2.0 < f3/fW < 7.0$
(4) $2.0 < f4/fW < 5.0$
(5) $1.5 < BF/fW < 5.0$
(6) $0.02 < d12/f4 < 1.0$
(7) $0.3 < r11/f3 < 1.5$
(8) $0.3 < |r13|/f4 < 3.0$
(9) $0.3 < |r17|/f4 < 1.5$ where fW denotes a focal length of the aspherical zoom lens at a wide angle end, fi (i=1, 2, 3, and 4) denotes a focal length of an i-th lens group; BF denotes an air spatial distance from the last lens face to the image plane; d12 denotes the air space between the third and the fourth lens groups; r11 denotes a radius of curvature of a face of the positive lens of the third lens group, which face confronts the object; r13 denotes a radius of curvature of a face of the cemented doublet of the fourth lens group; and r17 denotes a radius of curvature of a face of the positive lens of the fourth lens group.

According to another aspect of the invention, a video camera is provided. The video camera includes: an aspherical zoom lens; a color separation optical system for separating light output from the aspherical zoom lens into respective R, G, and B wavelength bands; and a plurality of imaging devices for converting images in the respective R, G, and B wavelength bands which are separated by the color separation optical system into pixel signals. The aspherical zoom lens includes sequentially from an object side: a first lens group which has a positive refractive power and is fixed relative to an image plane; a second lens group which has a negative refractive power and is movable on an optical axis of the aspherical zoom lens so as to have a magnification changing function; a third lens group which has a positive refractive power and is fixed relative to the image plane so as to have a light converging function; and a fourth lens group which has a positive refractive power and is movable on the optical axis so that the image plane displaceable in response to travel of the second lens group and movement of the object is fixed at a position spaced by a predetermined distance from a reference face, wherein an air space is provided between the third and the fourth lens groups, wherein when viewed sequentially from the object side, the first lens group includes a negative lens, a positive lens and a meniscus positive lens, the second lens group includes a meniscus negative lens, a double concave lens and a positive lens, the third lens group includes a single lens having at least one aspherical face, and the fourth lens group includes a cemented doublet and a positive lens, at least one of which has at least one aspherical face. The aspherical zoom lens satisfies the following conditions:

(1) $5.0 < f1/fW < 6.3$
(2) $0.9 < |f2|/fW < 1.2$
(3) $5.3 < f3/fW < 6.2$
(4) $3.0 < f4/fW < 3.3$
(5) $3.1 < BF/fW < 4.2$
(6) $0.1 < d12/f4 < 0.4$
(7) $0.5 < r11/f3 < 0.9$
(8) $1.1 < |r13|/f4 < 2.4$
(9) $0.6 < |r17|/f4 < 0.8$ where fW denotes a focal length of the aspherical zoom lens at a wide angle end, fi (i=1, 2, 3, and 4) denotes a focal length of an i-th lens group; BF denotes an air spatial distance from the last lens face to the image plane; d12 denotes the air space between the third and the fourth lens groups; r11 denotes a radius of curvature of a face of the positive lens of the third lens group, which face confronts the object; r13 denotes a radius of curvature of a face of the cemented doublet of the fourth lens group; and r17 denotes a radius of curvature of a face of the positive lens of the fourth lens group.

In one embodiment of the invention, at least one lens in the first lens group of the aspherical zoom lens has at least one aspherical face.

In another embodiment of the invention, at least one lens in the second lens group of the aspherical zoom lens has at least one aspherical face.

Thus, the invention described herein makes possible the advantages of (1) providing a high-performance aspherical zoom lens of simple construction having a zoom ratio of about 10 and a long back focal distance enabling the insertion of a color separation optical system, and (2) providing a video camera which is reduced in size and weight by using the aspherical zoom lens.

These and other advantages of the present invention will become apparent to those skilled in the art upon reading and understanding the following detailed description with reference to the accompanying figures.

DETAILED DESCRIPTION OF THE DRAWINGS

Figure 1:
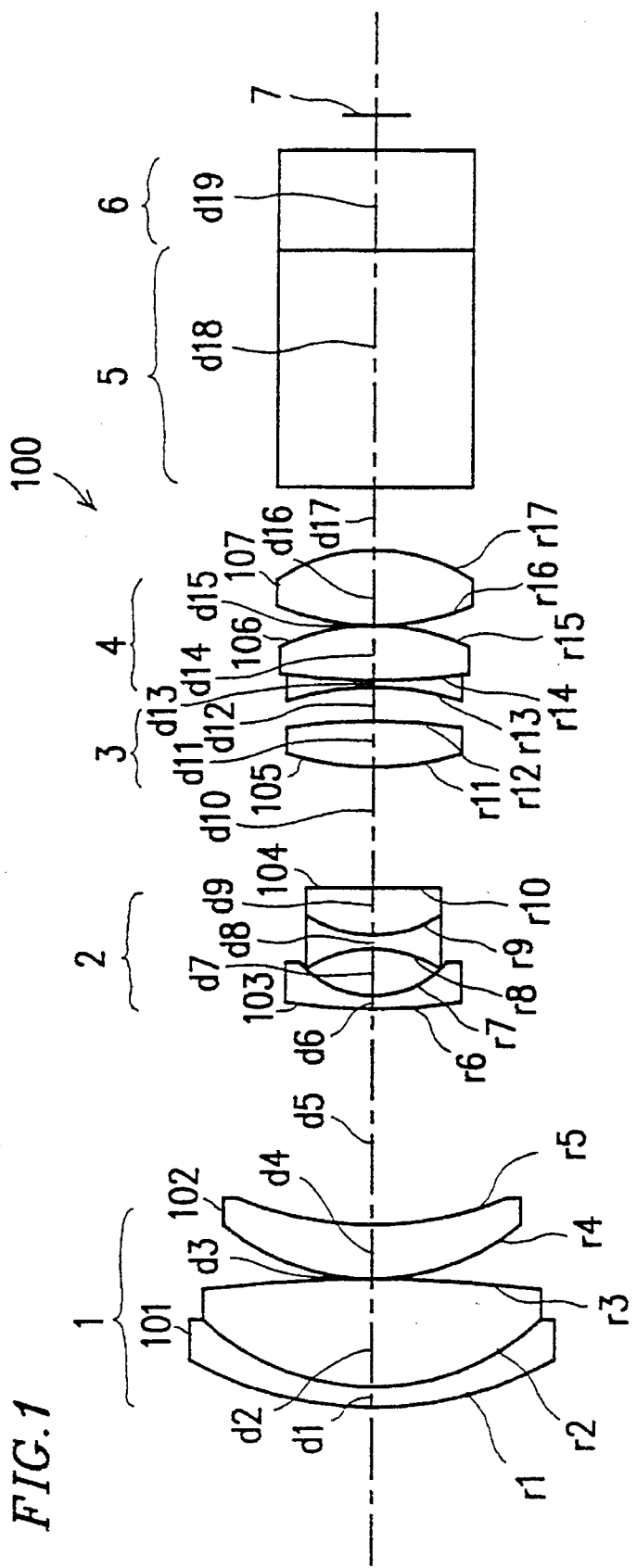
FIG. 1 is a view showing the structure of an aspherical zoom lens in a first example according to the invention.
Figure 2:
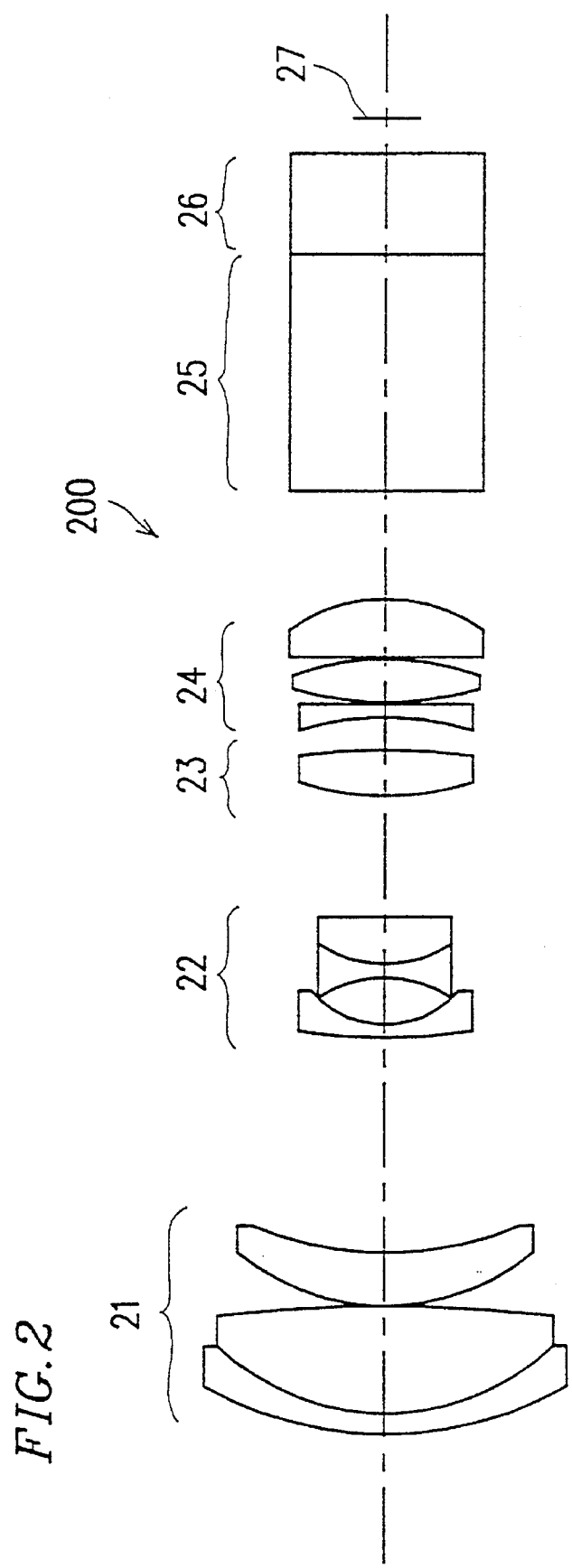
FIG. 2 is a view showing the structure of a conventional zoom lens for use in a video camera.
Figures 7A, 7B, 7C, 7D, 7E:
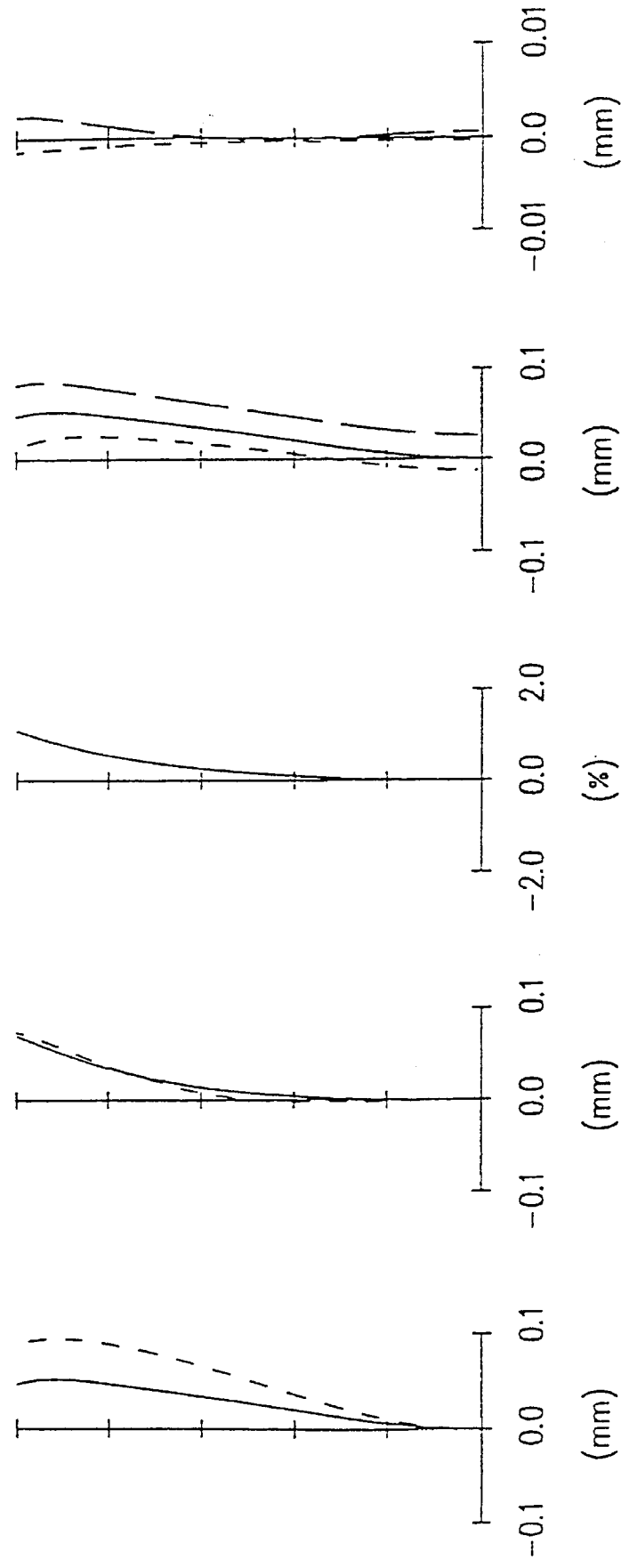

FIGS. 3A, 3B, 3C, 3D, and 3E show the spherical aberration; the astigmatism; the distortion; the chromatic aberration on axis; and the chromatic aberration of magnification, respectively, at the wide angle end for the first specific value set of the first example.

FIGS. 4A, 4B, 4C, 4D, and 4E show the spherical aberration; the astigmatism; the distortion; the chromatic aberration on axis; and the chromatic aberration of magnification, respectively, at the standard position for the first specific value set of the first example.

FIGS. 5A, 5B, 5C, 5D, and 5E show the spherical aberration; the astigmatism; the distortion; the chromatic aberration on axis; and the chromatic aberration of magnification, respectively, at the telephoto end for the first specific value set of the first example.

FIGS. 6A, 6B, 6C, 6D, and 6E show the spherical aberration; the astigmatism; the distortion; the chromatic aberration on axis; and the chromatic aberration of magnification, respectively, at the wide angle end for the second specific value set of the first example.

FIGS. 7A, 7B, 7C, 7D, and 7E show the spherical aberration; the astigmatism; the distortion; the chromatic aberration on axis; and the chromatic aberration of magnification, respectively, at the standard position for the second specific value set of the first example.

FIGS. 8A, 8B, 8C, 8D, and 8E show the spherical aberration; the astigmatism; the distortion; the chromatic aberration on axis; and the chromatic aberration of magnification, respectively, at the telephoto end for the second specific value set of the first example.

FIGS. 9A, 9B, 9C, 9D, and 9E show the spherical aberration; the astigmatism; the distortion; the chromatic aberration on axis; and the chromatic aberration of magnification, respectively, at the wide angle end for the third specific value set of the first example.

FIGS. 10A, 10B, 10C, 10D, and 10E show the spherical aberration; the astigmatism; the distortion; the chromatic aberration on axis; and the chromatic aberration of magnification, respectively, at the standard position for the third specific value set of the first example.

FIGS. 11A, 11B, 11C, 11D, and 11E show the spherical aberration; the astigmatism; the distortion; the chromatic aberration on axis; and the chromatic aberration of magnification, respectively, at the telephoto end for the third specific value set of the first example.

FIGS. 12A, 12B, 12C, 12D, and 12E show the spherical aberration; the astigmatism; the distortion; the chromatic aberration on axis; and the chromatic aberration of magnification, respectively, at the wide angle end for the fourth specific value set of the first example.

FIGS. 13A, 13B, 13C, 13D, and 13E show the spherical aberration; the astigmatism; the distortion; the chromatic aberration on axis; and the chromatic aberration of magnification, respectively, at the standard position for the fourth specific value set of the first example.

FIGS. 14A, 14B, 14C, 14D, and 14E show the spherical aberration; the astigmatism; the distortion; the chromatic aberration on axis; and the chromatic aberration of magnification, respectively, at the telephoto end for the fourth specific value set of the first example.

Figure 15:
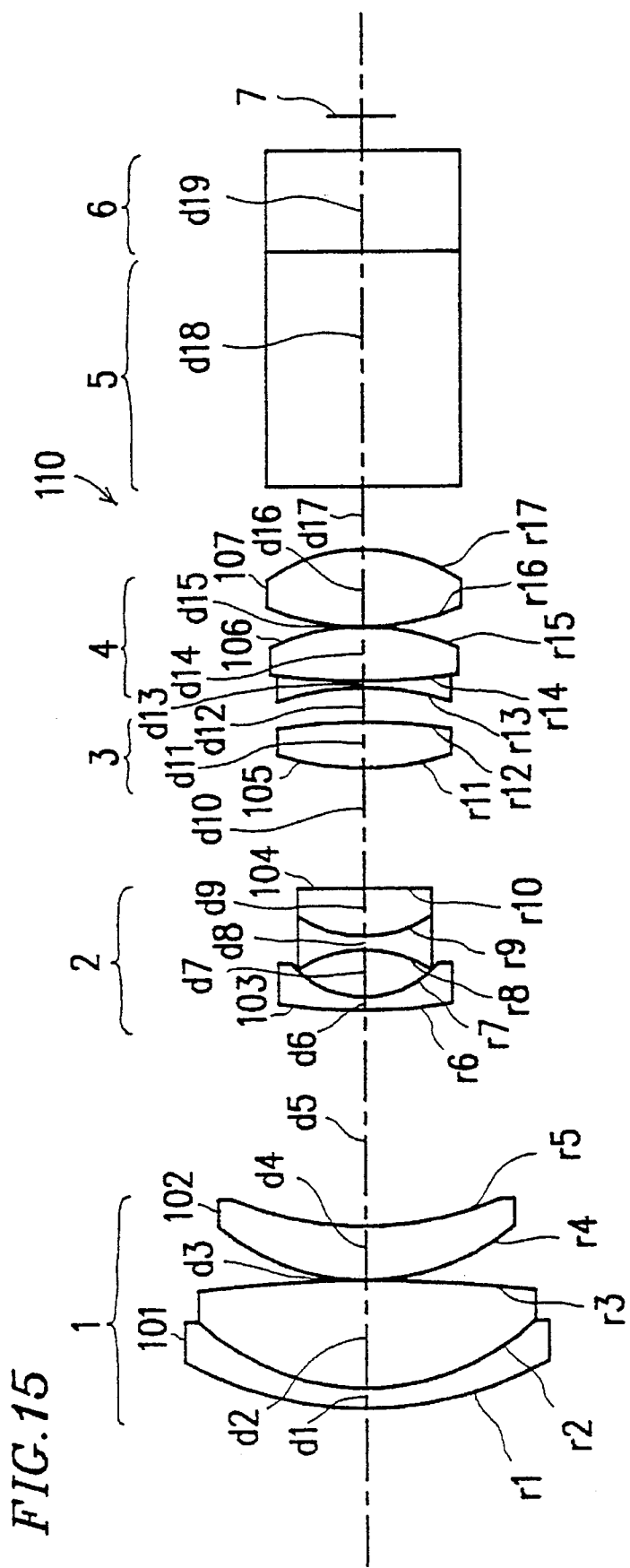
Figures 16A, 16B, 16C, 16D, 16E:
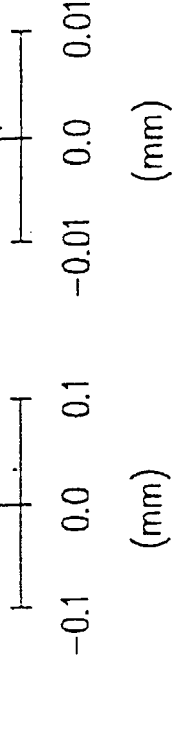
Figures 25A, 25B, 25C, 25D, 25E:
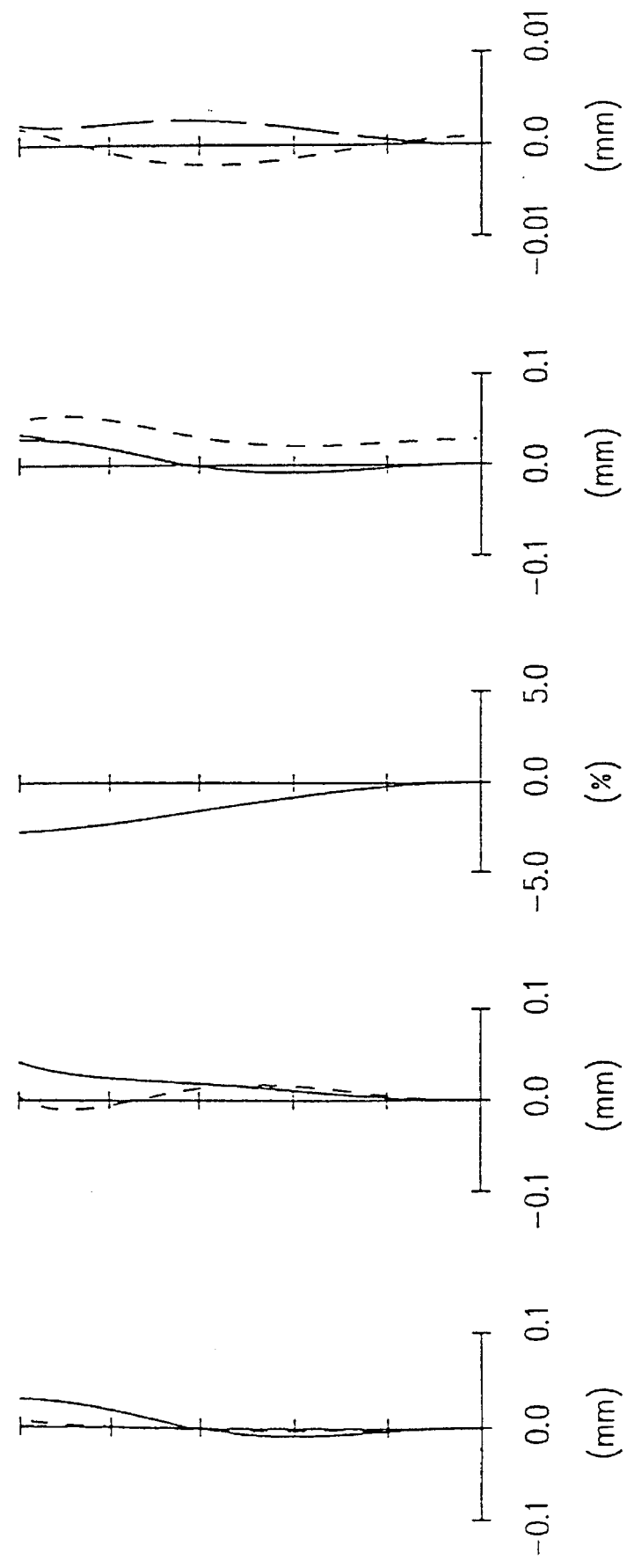

FIG. 15 is a view showing the structure of an aspherical zoom lens in a second example according to the invention.

FIGS. 16A, 16B, 16C, 16D, and 16E show the spherical aberration; the astigmatism; the distortion; the chromatic aberration on axis; and the chromatic aberration of magnification, respectively, at the wide angle end for the fifth specific value set of the second example.

FIGS. 17A, 17B, 17C, 17D, and 17E show the spherical aberration; the astigmatism; the distortion; the chromatic aberration on axis; and the chromatic aberration of magnification, respectively, at the standard position for the fifth specific value set of the second example.

FIGS. 18A, 18B, 18C, 18D, and 18E show the spherical aberration; the astigmatism; the distortion; the chromatic aberration on axis; and the chromatic aberration of magnification, respectively, at the telephoto end for the fifth specific value set of the second example.

FIGS. 19A, 19B, 19C, 19D, and 19E show the spherical aberration; the astigmatism; the distortion; the chromatic aberration on axis; and the chromatic aberration of magnification, respectively, at the wide angle end for the sixth specific value set of the second example.

FIGS. 20A, 20B, 20C, 20D, and 20E show the spherical aberration; the astigmatism; the distortion; the chromatic aberration on axis; and the chromatic aberration of magnification, respectively, at the standard position for the sixth specific value set of the second example.

FIGS. 21A, 21B, 21C, 21D, and 21E show the spherical aberration; the astigmatism; the distortion; the chromatic aberration on axis; and the chromatic aberration of magnification, respectively, at the telephoto end for the sixth specific value set of the second example.

FIGS. 22A, 22B, 22C, 22D, and 22E show the spherical aberration; the astigmatism; the distortion; the chromatic aberration on axis; and the chromatic aberration of magnification, respectively, at the wide angle end for the seventh specific value set of the second example.

FIGS. 23A, 23B, 23C, 23D, and 23E show the spherical aberration; the astigmatism; the distortion; the chromatic aberration on axis; and the chromatic aberration of magnification, respectively, at the standard position for the seventh specific value set of the second example.

FIGS. 24A, 24B, 24C, 24D, and 24E show the spherical aberration; the astigmatism; the distortion; the chromatic aberration on axis; and the chromatic aberration of magnification, respectively, at the telephoto end for the seventh specific value set of the second example.

FIGS. 25A, 25B, 25C, 25D, and 25E show the spherical aberration; the astigmatism; the distortion; the chromatic aberration on axis; and the chromatic aberration of magnification, respectively, at the wide angle end for the eighth specific value set of the second example.

FIGS. 26A, 26B, 26C, 26D, and 26E show the spherical aberration; the astigmatism; the distortion; the chromatic aberration on axis; and the chromatic aberration of magnification, respectively, at the standard position for the eighth specific value set of the second example.

FIGS. 27A, 27B, 27C, 27D, and 27E show the spherical aberration; the astigmatism; the distortion; the chromatic aberration on axis; and the chromatic aberration of magnification, respectively, at the telephoto end for the eighth specific value set of the second example.

Figure 28:
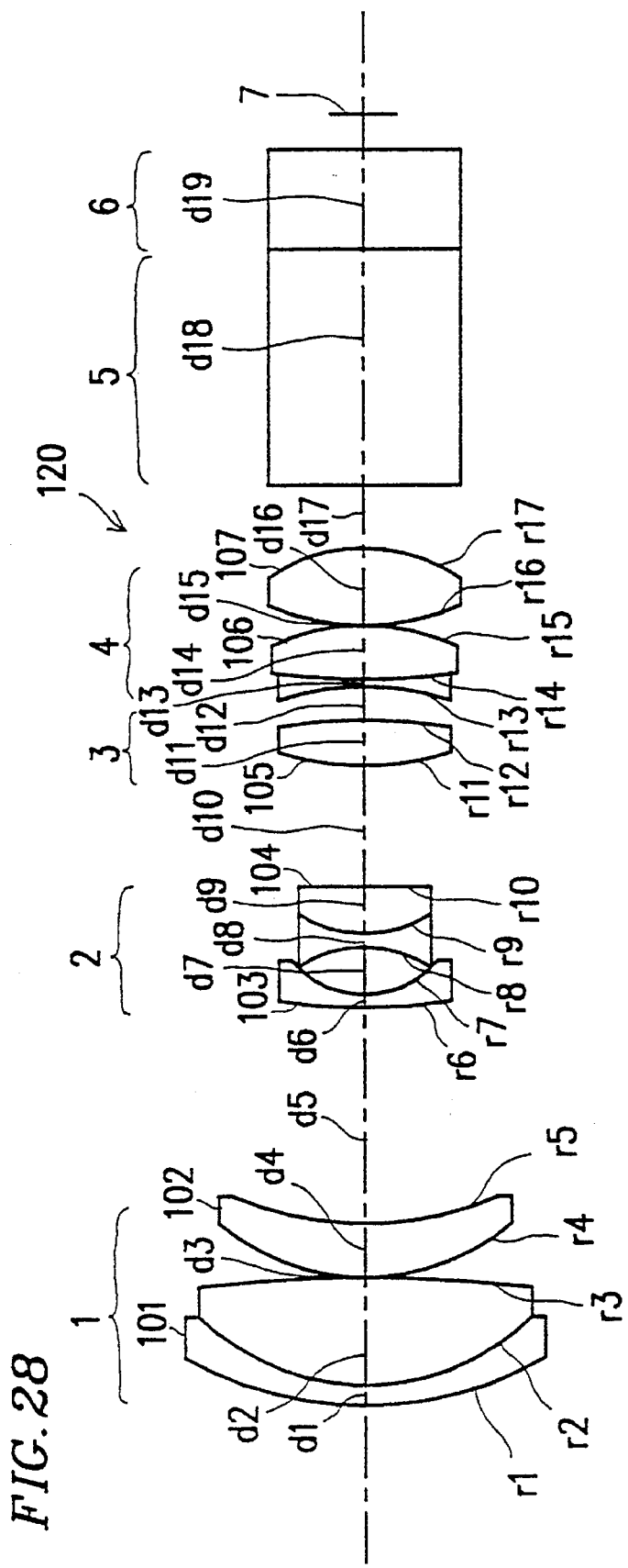
Figures 29A, 29B, 29C, 29D, 29E:
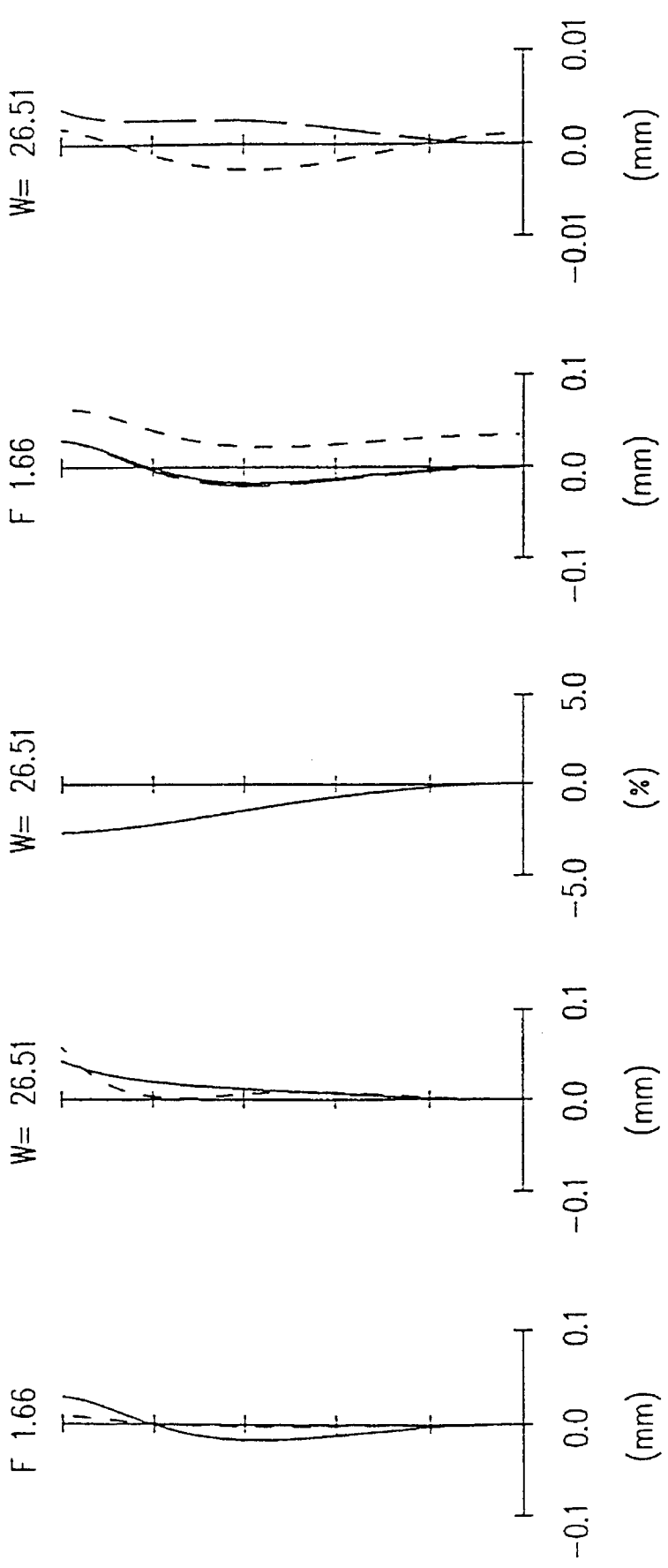

FIG. 28 is a view showing the structure of an aspherical zoom lens in a third example according to the invention.

FIGS. 29A, 29B, 29C, 29D, and 29E show the spherical aberration; the astigmatism; the distortion; the chromatic aberration on axis; and the chromatic aberration of magnification, respectively, at the wide angle end for the ninth specific value set of the third example.

FIGS. 30A, 30B, 30C, 30D, and 30E show the spherical aberration; the astigmatism; the distortion; the chromatic aberration on axis; and the chromatic aberration of magnification, respectively, at the standard position for the ninth specific value set of the third example.

FIGS. 31A, 31B, 31C, 31D, and 31E show the spherical aberration; the astigmatism; the distortion; the chromatic aberration on axis; and the chromatic aberration of magnification, respectively, at the telephoto end for the ninth specific value set of the third example.

FIGS. 32A, 32B, 32C, 32D, and 32E show the spherical aberration; the astigmatism; the distortion; the chromatic aberration on axis; and the chromatic aberration of magnification, respectively, at the wide angle end for the tenth specific value set of the third example.

FIGS. 33A, 33B, 33C, 33D, and 33E show the spherical aberration; the astigmatism; the distortion; the chromatic aberration on axis; and the chromatic aberration of magnification, respectively, at the standard position for the tenth specific value set of the third example.

FIGS. 34A, 34B, 34C, 34D, and 34E show the spherical aberration; the astigmatism; the distortion; the chromatic aberration on axis; and the chromatic aberration of magnification, respectively, at the telephoto end for the tenth specific value set of the third example.

FIG. 35 schematically shows a 3-CCD type video camera according to a fourth example of the invention.

DESCRIPTION OF THE PREFERRED EMBODIMENTS

Hereinafter, the present invention will be described by way of illustrative examples with reference to the accompanying drawings.

EXAMPLE 1

FIG. 1 is a view showing the structure of an aspherical zoom lens 100 in a first example according to the invention. As is shown in FIG. 1, the zoom lens 100 includes a first lens group 1, a second lens group 2, a third lens group 3, a fourth lens group 4, a color separation optical system 5, and a flat plate 6 which is optically equivalent to a quartz crystal filter, a face plate of an imaging device, and the like. The flat plate 6 is sometimes referred as a dummy glass. The reference numeral 7 denotes an image plane.

Respective lens faces are referred to as first to seventeenth faces which are numbered from the side on which an object to be imaged is located. In FIG. 1, the radius of curvature of the i-th face is represented by ri. Similarly, thicknesses of respective lenses, air spaces between adjacent lenses, the thickness of the color separation optical system 5, and the thickness of the flat plate 6 are represented by di numbered from the side on which the object to be imaged is located.

The operation of the zoom lens 100 having the above-described arrangement is described below. The first lens group 1 is fixed at a predetermined position relative to the image plane 7. The first lens group 1 has a positive refractive power and an image forming function. The second lens group 2 has a negative refractive power. The second lens group 2 is movable on an optical axis so as to have a magnification changing function. The third lens group 3 is fixed, and has an aspherical lens having a positive refractive power, so as to have a light converging function. The fourth lens group 4 has a positive refractive power. The fourth lens group 4 is movable on the optical axis so as to make focusing adjustments, and includes an aspherical lens. Variations in position of the image plane due to travel of the second lens group 2 at the time of zooming are eliminated by displacing the forth lens group 4. Thus, the image plane is fixed at a predetermined position. In other words, an image plane is maintained at a position spaced by a predetermined distance from a reference face. A relatively large air space is provided between the third and the fourth lens groups 3 and 4.

When viewed sequentially from the object side, the first lens group 1 includes a cemented doublet 101 and a meniscus lens 102 having a positive refractive power. The cemented doublet 101 may include a negative lens and a positive lens. The second lens group 2 includes a meniscus lens 103 having a negative refractive power and a cemented doublet 104. The cemented doublet 104 may include a double concave lens and a positive lens. The third lens group 3 includes a single lens 105 having at least one aspherical face. The fourth lens group 4 includes a cemented doublet 106 and one positive lens 107. In the fourth lens group 4, at least one of the lenses has at least one aspherical surface.

In order to make the zoom lens compact, it is necessary to increase the refractive power of each of the first to fourth lens groups 1 to 4. In addition, excellent aberration performance can be obtained by optimally designing types, face contours, etc. of the lenses in each of the first to fourth lens groups 1 to 4. For these purposes, the following parameters of the zoom lens should satisfy the given conditions.

(1) f1/fW
(2) |f2|/fW
(3) f3/fW
(4) f4/fW
(5) BF/fW
(6) d12/f4
(7) r11/f3
(8) |r13|/f4
(9) |r17|/f4 where, fi denotes the focal length of an i-th lens group (i=1, 2, 3, and 4); fW denotes the focal length at a wide angle of the zoom lens; BF denotes the air spatial distance from the last lens face to the image plane 7; d12 denotes the air space between the third and the fourth lens groups 3 and 4; r11 denotes the radius of curvature of the face of the positive lens 105 of the third lens group 3, which face confronts the object; r13 denotes the radius of curvature of the face of the cemented doublet 106 of the fourth lens group 4; and r17 denotes the radius of curvature of the face of the positive lens 107 of the fourth lens group 4.

The above parameters (1), (2), (3), and (4) specify refractive powers of each of the first to fourth lens groups 1 to 4. Thus, the parameters provide conditions on refractive power of each lens group for realizing a compact zoom lens system.

The fact that the third lens group 3 consists of the aspherical lens having the convex face confronting the object is essential for the requirements that the third lens group 3 is constituted by which the single lens 105 and various aberrations of the large aperture having an F-number of about 1.6 to 1.8 are corrected. Especially, the aspherical face of the third lens group 3 exercises a great effect on the correction of the spherical aberration.

The fact that the fourth lens group 4 is constituted of the cemented doublet 106 and the one positive lens 107 and at least one of the lenses has at least one aspherical face is essential for the requirements that the zoom lens has a long back focal distance and chromatic aberration on and off the optical axis and monochromatic aberration off the optical axis (especially, coma) are only corrected by the two lenses, so as to reduce the strictness of tolerance for the assembling process. Especially, the use of the cemented doublet 106 in the fourth lens group 4 less causes the inclination of the lens in the assembling process and the practical use of the zoom lens system, as compared with the conventional case where three signal lenses are used. Accordingly, a high performance of the zoom lens system can be attained and the high performance can be maintained.

Hereinbelow, the conditions to be satisfied are described in detail.

The parameter (1) relates to the refractive power of the first lens group 1. By setting a certain range of parameter (1), it is possible to determine the condition relating to the refractive power of the first lens group 1. When the value of parameter (1) falls below the lower limit, refractive power of the first lens group 1 becomes too large, so that it becomes difficult to correct spherical aberration on the long focus side. When the value of parameter (1) exceeds the upper limit, the lens length becomes large and thus it is impossible to make the zoom lens compact.

In this example, the value of the ratio expressed by parameter (1) f1/fW is set so as to satisfy the following condition:

$$3.0 < f1/fW < 8.0$$

In order to obtain a higher performance, it is preferred that the value of parameter (1) satisfies the following condition:

$$5.0 < f1/fW < 6.3$$

The parameter (2) relates to the refractive power of the second lens group 2. By setting a certain range of parameter (2), it is possible to determine the condition relating to the refractive power of the second lens group 2. When the value of parameter (2) falls below the lower limit, the zoom lens system can be made compact but the Petzval sum of the entire system becomes greatly negative, so that the curvature of the field cannot be corrected by merely selecting any glass material for use. When the value of parameter (2) exceeds the upper limit, the aberration correction can be performed easily but the magnification changing system becomes large and thus the entire system cannot be made compact.

In this example, the value of the ratio expressed by parameter (2) |f2|/fW is set so as to satisfy the following condition:

$$0.5 < |f2|/fW < 1.6$$

In order to obtain a higher performance, it is preferred that the value of parameter (2) satisfies the following condition:

$$0.9 < |f2|/fW < 1.2$$

The parameter (3) relates to the refractive power of the third lens group 3. By setting a certain range of parameter (3), it is possible to determine the condition relating to the refractive power of the third lens group 3. When the value of parameter (3) falls below the lower limit, the refractive power of the third lens group 3 becomes too large. As a result, the back focal distance is not long enough to insert the color separation optical system and it becomes difficult to correct spherical aberration. When the value of the parameter (3) exceeds the upper limit, a combination of the first, second and third lens groups 1, 2, and 3 becomes a divergent system, so that diameters of the lenses of the fourth lens group 4 disposed rearwards of the divergent system cannot be made small and the Petzval sum of the entire system cannot be made small.

In this example, the value of the ratio expressed by parameter (3) f3/fW is set so as to satisfy the following condition:

$$2.0 < f3/fW < 7.0$$

In order to obtain a higher performance, it is preferred that the value of parameter (3) satisfies the following condition:

$$5.3 < f3/fW < 6.2$$

The parameter (4) relates to the refractive power of the fourth lens group 4. By setting a certain range of parameter (4), it is possible to determine the condition relating to the refractive power of the fourth lens group 4. When the value of parameter (4) falls below the lower limit, the image containing range becomes narrow. Thus, in order to obtain a desired image containing range, diameters of the lenses of the first lens group 1 should be increased and thus, the zoom lens cannot be made compact and light. When the value of parameter (4) exceeds the upper limit, the aberration correction is performed easily but the travel stroke of the fourth lens group 4 at the time of short-distance shooting becomes large. As a result, not only the entire system cannot be made compact but it becomes difficult to correct the imbalance between the aberration off the optical axis at the time of short-distance shooting and that at the time of long-distance shooting.

In this example, the value of the ratio expressed by parameter (4) f4/fW is set so as to satisfy the following condition:

$$2.0 < f4/fW < 5.0$$

In order to obtain a higher performance, it is preferred that the value of parameter (4) satisfies the following condition:

$$3.0 < f4/fW < 3.3$$

The parameter (5) relates to a back focal distance, in which BF denotes an air spatial distance from the last lens face to the image plane. Herein, the term "the air spatial distance" means a distance from the last lens face to the image plane without a color separation optical system 5 and a flat plate 6 shown in FIG. 1, 5, or 28. When the value of parameter (5) falls below the lower limit, the back focal distance is not long, so that it is impossible to insert a color separation optical system having a length required for sufficient color separation. When the value of parameter (5) exceeds the upper limit, the back focal distance becomes too long and thus the entire system cannot be made compact.

In this example, the value of the ratio expressed by parameter (5) BF/fW is set so as to satisfy the following condition:

$$1.5 < BF/fW < 5.0$$

In order to obtain a higher performance, it is preferred that the value of parameter (5) satisfies the following condition:

$$3.1 < BF/fW < 4.2$$

The parameter (6) relates to the air space between the third and the fourth lens groups 3 and 4. When the value of parameter (6) falls below the lower limit, the height of the light ray off the optical axis becomes small, so that it becomes difficult to correct the chromatic aberration off the optical axis by merely selecting any glass material for use. Meanwhile, since the travel stroke of the fourth lens group 4 at the time of short-distance shooting is restricted, a sufficiently short close-up distance cannot be obtained. When the value of parameter (6) exceeds the upper limit, it is difficult to make the entire system compact. Meanwhile, when a sufficiently large quantity of light is ensured around an image plane, the diameters of the lenses of the fourth lens group 4 cannot be reduced.

In this example, the value of the ratio expressed by parameter (6) d12 /f4 is set so as to satisfy the following condition:

$$0.02 < d12 /f4 < 1.0$$

In order to obtain a higher performance, it is preferred that the value of parameter (6) satisfies the following condition:

$$0.1 < d12 /f4 < 0.4$$

The parameter (7) relates to a radius of curvature of the face of the aspherical lens 105 of the third lens group 3, which face confronts the object. When an aspherical face is provided on one face of the aspherical lens 105 confronting the object or the other face of the aspherical lens 105 confronting the image plane 7 or on both faces of the aspherical lens 105 and the contours of the aspherical face is designed in an optimum manner, various aberrations can be sufficiently corrected in spite of the fact that the third lens group 3 consists of a single lens. When the value of parameter (7) falls below the lower limit, it becomes difficult to correct the spherical aberration. When the value of parameter (7) exceeds the upper limit, it becomes difficult to correct the comatic aberration of light rays off the optical axis below the principal light ray.

In this example, the value of the ratio expressed by parameter (7) r11 /f3 is set so as to satisfy the following condition:

$$0.3 < r11 /f3 < 1.5$$

In order to obtain a higher performance, it is preferred that the value of parameter (7) satisfies the following condition:

$$0.5 < r11 /f3 < 0.9$$

The parameter (8) relates to the radius of the curvature of the face of the negative lens portion of the cemented doublet 106 of the fourth lens group 4, which face confronts the object. When the value of parameter (8) falls below the lower limit, the incident angle relative to the face of the negative lens portion becomes large and thus it becomes difficult to correct the comatic aberration of light rays off the optical axis below the principal light ray. When the value of parameter (8) exceeds the upper limit, the refractive power of the cemented doublet 106 cannot be increased and thus a sufficiently long back focal distance cannot be obtained.

In this example, the value of the ratio expressed by parameter (8) |r13|/f4 is set so as to satisfy the following condition:

$$0.3 < |r13|/f4 < 3.0$$

In order to obtain a higher performance, it is preferred that the value of parameter (8) satisfies the following condition:

$$1.1 < |r13|/f4 < 2.4$$

The parameter (9) relates to the radius of the curvature of the face of the positive lens 107 of the fourth lens group 4, which face confronts the image plane 7. When the value of parameter (9) falls below the lower limit, the exit angle from the face becomes large, so that it becomes difficult to correct the comatic aberration of light rays off the optical axis over the principal light ray and curvature of the field at the side of the wide angle. When the value of parameter (9) exceeds the upper limit, the refractive power of the positive lens portion of the cemented doublet 106 of the fourth lens group 4 becomes large and thus a sufficiently long back focal distance cannot be obtained.

In this example, the value of the ratio expressed by parameter (9) |r17|/f4 is set so as to satisfy the following condition:

$$0.3 < |r17|/f4 < 1.5$$

In order to obtain a higher performance, it is preferred that the value of parameter (9) satisfies the following condition:

$$0.6 < |r17|/f4 < 0.8$$

Next, a first specific value set of the first example is shown in Table 1 below. In Table 1, r denotes the radius of curvature of the face of each of the lenses of the zoom lens; d denotes the thickness of each of the lenses of the zoom lens or an air space between the lenses; n denotes the refractive index for the d-line of each of the lenses of the zoom lens; and ν denotes the Abbe number for the d-line of each of the lenses of the zoom lens.

The contour of the aspherical face is defined by the following expression:

$$SAG = \frac{Y^2/R}{1 + \sqrt{1 - (1+K)(Y/R^2)}} + AD \cdot Y^4 + AE \cdot Y^6 + AF \cdot Y^8 + AG \cdot Y^{10}$$

where SAG denotes the distance between the vertex of the aspherical face and the point on the aspherical face when the height of the point from the optical axis is expressed by Y; R denotes the radius of curvature of the vertex of the aspherical face; K denotes a conical constant; and AD, AE, AF, and AG denote aspherical coefficients.

TABLE 1

| Lens group | i of i-th face | r | d | n | ν |
|---|---|---|---|---|---|
| 1 | 1 | 23.885 | 0.90 | 1.80518 | 25.4 |
|  | 2 | 14.144 | 4.80 | 1.58913 | 61.0 |
|  | 3 | −77.082 | 0.10 |  |  |
|  | 4 | 12.763 | 2.20 | 1.60311 | 60.7 |
|  | 5 | 21.082 | Variable |  |  |
| 2 | 6 | 21.082 | 0.60 | 1.77250 | 49.6 |
|  | 7 | 4.444 | 2.30 |  |  |
|  | 8 | −5.566 | 0.70 | 1.66547 | 55.2 |
|  | 9 | 5.566 | 2.00 | 1.79925 | 24.5 |
|  | 10 | ∞ | Variable |  |  |
| 3 | 11 | 13.761 | 1.65 | 1.51450 | 63.1 |
|  | 12 | −47.027 | Variable |  |  |
| 4 | 13 | −19.076 | 0.60 | 1.84666 | 23.9 |
|  | 14 | 33.837 | 1.90 | 1.51450 | 63.1 |
|  | 15 | −11.434 | 0.10 |  |  |
|  | 16 | 19.578 | 2.80 | 1.51633 | 64.1 |
|  | 17 | −9.710 | Variable |  |  |
| 5 | 18 | ∞ | 12.00 | 1.58913 | 61.0 |
| 6 | 19 | ∞ | 3.70 | 1.51633 | 64.1 |
|  | 20 | ∞ | — |  |  |

In Table 1, the eleventh and twelfth faces (both lens faces of the lens 105 of the third lens group 3), and the fifteenth face (one lens face of the cemented doublet 106 of the fourth lens group 4) are aspherical, and the aspherical coefficients are shown in Table 2 below.

TABLE 2

| i of i-th face | 11 | 12 | 15 |
|---|---|---|---|
| K | 2.73356E-1 | 0.00000 | −2.60011 |
| D | −6.83552E-5 | 2.11932E-4 | 9.68446E-5 |
| E | −3.04075E-5 | −3.56120E-5 | 8.12275E-6 |
| F | −1.14272E-7 | 2.39333E-7 | −1.23352E-8 |
| G | 1.71387E-8 | 3.22460E-9 | 1.02777E-9 |

Then, examples of the air space variable by zooming are shown in Tables 3, 4, and 5 below. Table 3 shows the values of the air space obtained when an object is disposed at an infinite distance from the zoom lens. Table 4 shows values of the air space obtained when the object is disposed at a distance of 2 m measured from the end of the zoom lens. Table 5 shows values of the air space obtained when the object is disposed at a distance of 1 m measured from the end of the zoom lens. In Tables 3, 4, and 5, the indication "Standard" means a standard position where the lateral magnification of the second lens group is 1:1 for each position of the object point. In Tables 3, 4, and 5, the row having indications "f" and "F/NO" show the focal distances and the F-numbers at the wide angle end and the telephoto end, respectively.

TABLE 3

|  | Wide angle | Standard | Telephoto |
|---|---|---|---|
| f | 4.060 | 19.349 | 40.337 |
| F/NO | 1.844 | 2.214 | 2.391 |
| d5 | 0.700 | 9.105 | 11.771 |
| d10 | 11.948 | 3.544 | 2.478 |
| d12 | 4.750 | 1.808 | 4.750 |
| d17 | 1.000 | 3.942 | 1.000 |

TABLE 4

|  | Wide angle | Standard | Telephoto |
|---|---|---|---|
| f | 4.060 | 20.670 | 40.283 |
| F/NO | 1.844 | 2.240 | 2.280 |
| d5 | 0.700 | 9.346 | 11.771 |
| d10 | 11.948 | 3.302 | 2.478 |
| d12 | 4.742 | 1.587 | 3.978 |
| d17 | 1.008 | 4.162 | 1.772 |

TABLE 5

|  | Wide angle | Standard | Telephoto |
|---|---|---|---|
| f | 4.060 | 22.138 | 40.232 |
| F/NO | 1.845 | 2.268 | 2.274 |
| d5 | 0.700 | 9.595 | 11.771 |
| d10 | 11.948 | 3.053 | 2.478 |
| d12 | 4.734 | 1.384 | 3.277 |
| d17 | 1.016 | 4.366 | 2.473 |

The conditions for parameters (1) to (9) for the first specific value set of the first example are shown in Table 6, below.

Table 6

(1) f1/fW=5.39

(2) |f2|/fW=0.96

(3) f3/fW=5.14

(4) f4/fW=3.15

(5) BF/fW=3.2 to 4.0

(6) d12/f4=0.11 to 0.14

(7) r11/f3=0.66

(8) |r13|/f4=1.49

(9) |r17|/f4=0.76

FIGS. 3A to 5E show aberrations, at the wide angle end, the standard position, and the telephoto end of the aspherical zoom lens for the first specific value set of the first example. FIGS. 3A, 3B, 3C, 3D, and 3E show the spherical aberration; the astigmatism; the distortion; the chromatic aberration on axis; and the chromatic aberration of magnification, respectively, at the wide angle end. FIGS. 4A, 4B, 4C, 4D, and 4E show the respective aberrations at the standard position. FIGS. 5A, 5B, 5C, 5D, and 5E show the respective aberrations at the telephoto end. From these figures, it is found that the zoom lens in this example exhibits excellent optical performance.

In the diagram showing the spherical aberration, curve of a solid line indicates the characteristic for the light rays corresponding to the d-line, and curve of a dotted line indicates the sine condition. In the diagram showing the astigmatism, curve of a solid line indicates the curvature of field in the case of using sagittal rays (the sagittal image surface), and curve of a dotted line indicates the curvature of field in the case of using meridional rays (the meridional image surface). In the diagrams showing the chromatic aberration on axis and the chromatic aberration of magnification, curve of a solid line indicates the chromatic aberration for the light rays corresponding to the d-line, curve of a dotted line indicates the chromatic aberration for the light rays corresponding to the F-line, and curve of a broken line indicates the chromatic aberration for the light rays corresponding to the C-line. In some cases, the curve indicating the chromatic aberration for the light rays corresponding to the C-line (broken line) may overlap the curve indicating the chromatic aberration for the light rays corresponding to the d-line. As the reference, the above descriptions relating to respective curves are shown in FIGS. 5A through 5E. These descriptions are also applied to the remaining figures.

Next, a second specific value set which satisfies the conditions of the first example is shown in Table 7.

TABLE 7

| Lens group | i of i-th face | r | d | n | v |
|---|---|---|---|---|---|
| 1 | 1 | 23.885 | 0.90 | 1.80518 | 25.4 |
|   | 2 | 14.144 | 4.80 | 1.58913 | 61.0 |
|   | 3 | −77.082 | 0.10 |   |   |
|   | 4 | 12.763 | 2.20 | 1.60311 | 60.7 |
|   | 5 | 21.082 | Variable |   |   |
| 2 | 6 | 21.082 | 0.60 | 1.77250 | 49.6 |
|   | 7 | 4.444 | 2.30 |   |   |
|   | 8 | −5.566 | 0.70 | 1.66547 | 55.2 |
|   | 9 | 5.566 | 2.00 | 1.79925 | 24.5 |
|   | 10 | ∞ | Variable |   |   |
| 3 | 11 | 16.435 | 1.65 | 1.51450 | 63.1 |
|   | 12 | −34.757 | Variable |   |   |
| 4 | 13 | −14.996 | 0.60 | 1.84666 | 23.9 |
|   | 14 | 99.132 | 1.90 | 1.51450 | 63.1 |
|   | 15 | −9.136 | 0.10 |   |   |
|   | 16 | 17.652 | 2.80 | 1.48749 | 66.0 |
|   | 17 | −10.551 | Variable |   |   |
| 5 | 18 | ∞ | 12.00 | 1.58913 | 61.0 |
| 6 | 19 | ∞ | 3.70 | 1.51633 | 64.1 |
|   | 20 | ∞ | — |   |   |

Similar to the above example, the eleventh, the twelfth, and the fifteenth faces are aspherical, and the aspherical coefficients are shown in Table 8 below.

TABLE 8

| i of i-th face | 11 | 12 | 15 |
|---|---|---|---|
| K | 2.73356E-1 | 0.00000 | −2.60011 |
| D | −6.83552E-5 | 2.11932E-4 | −1.63358E-4 |
| E | −3.04075E-5 | −3.56120E-5 | 7.99130E-6 |
| F | −1.14272E-7 | 2.39333E-7 | −1.23352E-8 |
| G | 1.71387E-8 | 3.22460E-9 | 1.02777E-9 |

Table 9 shows values of the air space variable by zooming which are obtained when the object is disposed at a distance of 2 m measured from the end of the zoom lens.

TABLE 9

|  | Wide angle | Standard | Telephoto |
|---|---|---|---|
| f | 4.000 | 20.429 | 39.751 |
| F/NO | 1.841 | 2.221 | 2.248 |
| d5 | 0.700 | 9.346 | 11.771 |
| d10 | 11.948 | 3.302 | 2.478 |
| d12 | 4.742 | 1.661 | 4.007 |
| d17 | 1.008 | 4.089 | 1.743 |

The conditions for parameters (1) to (9) for the second specific value set of the first example are shown in Table 10, below.

Table 10

(1) f1/fW=5.47

(2) |f2|/fW=0.98

(3) f3/fW=5.48

(4) f4/fW=3.14

(5) BF/fW=3.3 to 4.0

(6) d12/f4=0.11 to 0.15

(7) r11/f3=0.75

(8) |r13|/f4=1.19

(9) |r17|/f4=0.84

FIGS. 6A to 8E show aberrations at the wide angle end, the standard position, and the telephoto end of the aspherical zoom lens for the second specific value set of the first example. FIGS. 6A, 6B, 6C, 6D, and 6E show the spherical aberration; the astigmatism; the distortion; the chromatic aberration on axis; and the chromatic aberration of magnification, respectively, at the wide angle end. FIGS. 7A, 7B, 7C, 7D, and 7E show the respective aberrations at the standard position. FIGS. 8A, 8B, 8C, 8D, and 8E show the respective aberrations at the telephoto end. From these figures above, it is found that the zoom lens in this example exhibits excellent optical performance.

Next, a third specific value set which satisfies the conditions of the first example is shown in Table 11.

TABLE 11

| Lens group | i of i-th face | r | d | n | v |
|---|---|---|---|---|---|
| 1 | 1 | 24.044 | 0.90 | 1.80518 | 25.4 |
|   | 2 | 14.128 | 4.80 | 1.58913 | 61.0 |
|   | 3 | −74.619 | 0.10 |   |   |
|   | 4 | 13.166 | 2.20 | 1.60311 | 60.7 |
|   | 5 | 20.021 | Variable |   |   |
| 2 | 6 | 11.618 | 0.60 | 1.77250 | 49.6 |
|   | 7 | 4.728 | 2.30 |   |   |
|   | 8 | −5.752 | 0.70 | 1.66547 | 55.2 |
|   | 9 | 5.262 | 2.00 | 1.79925 | 24.5 |
|   | 10 | 36.003 | Variable |   |   |
| 3 | 11 | 14.961 | 1.65 | 1.51450 | 63.1 |
|   | 12 | −58.877 | Variable |   |   |
| 4 | 13 | −16.795 | 0.60 | 1.84666 | 23.9 |
|   | 14 | 249.969 | 1.90 | 1.51450 | 63.1 |
|   | 15 | −9.593 | 0.10 |   |   |
|   | 16 | 16.805 | 2.80 | 1.48749 | 66.0 |
|   | 17 | −11.394 | Variable |   |   |
| 5 | 18 | ∞ | 12.00 | 1.58913 | 61.0 |
| 6 | 19 | ∞ | 3.70 | 1.51633 | 64.1 |
|   | 20 | ∞ | — |   |   |

Similarly, the eleventh, the twelfth, and the fifteenth faces are aspherical, and the aspherical coefficients are shown in Table 12 below.

TABLE 12

| i of i-th face | 11 | 12 | 15 |
|---|---|---|---|
| K | 2.73356D-1 | 0.00000 | −2.60011 |
| D | −6.89093E-5 | 2.11932E-4 | −1.63358E-4 |
| E | −3.04075E-5 | −3.56120E-5 | 7.99130E-6 |
| F | −1.14272E-7 | 2.39333E-7 | −1.23352E-8 |
| G | 1.71387E-8 | 3.22460E-9 | 1.02777E-9 |

Table 13 shows the values of the air space variable by zooming which are obtained when the object is disposed at a distance of 2 m measured from the end of the zoom lens.

TABLE 13

|  | Wide angle | Standard | Telephoto |
|---|---|---|---|
| f | 4.407 | 21.178 | 41.204 |
| F/NO | 1.856 | 2.193 | 2.329 |
| d5 | 0.400 | 9.230 | 12.000 |
| d10 | 12.248 | 3.418 | 2.248 |
| d12 | 4.829 | 1.846 | 4.505 |
| d17 | 0.921 | 3.902 | 1.245 |

The conditions for parameters (1) to (9) for the third specific value set of the first example are shown in Table 14, below.

Table 14

(1) f1/fW=5.23

(2) f2/fW=0.98

(3) f3/fW=5.30

(4) f4/fW=2.81

(5) BF/fW=2.9 to 3.6

(6) d12/f4=0.13 to 0.17

(7) r11/f3=0.64

(8) |r13|/f4=1.36

(9) |r17|/f4=0.92

Figure 9A:
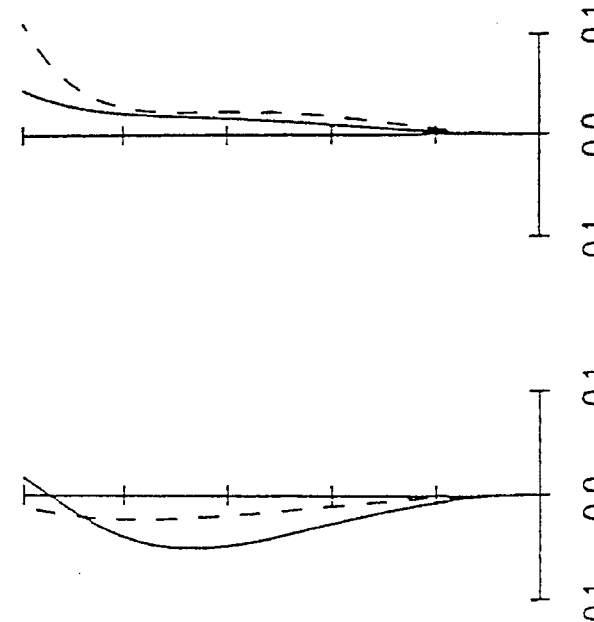
Figure 9B:
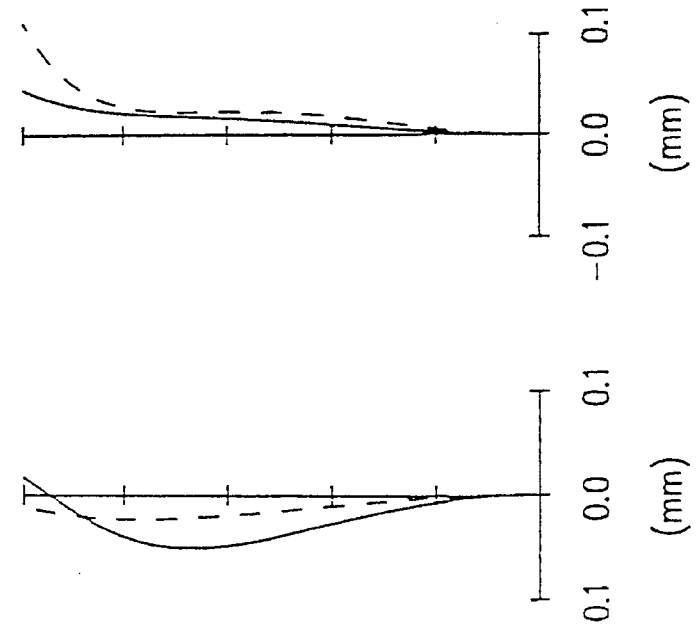
Figure 9C:
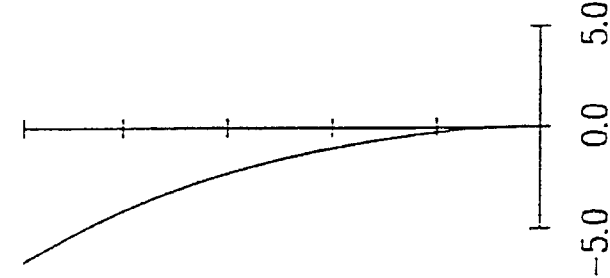
Figure 9D:
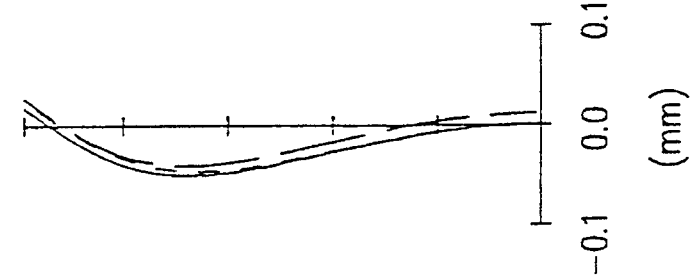
Figure 9E:
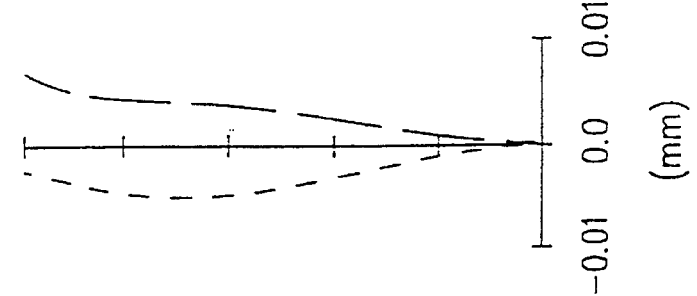
Figures 12A, 12B, 12C, 12D, 12E:
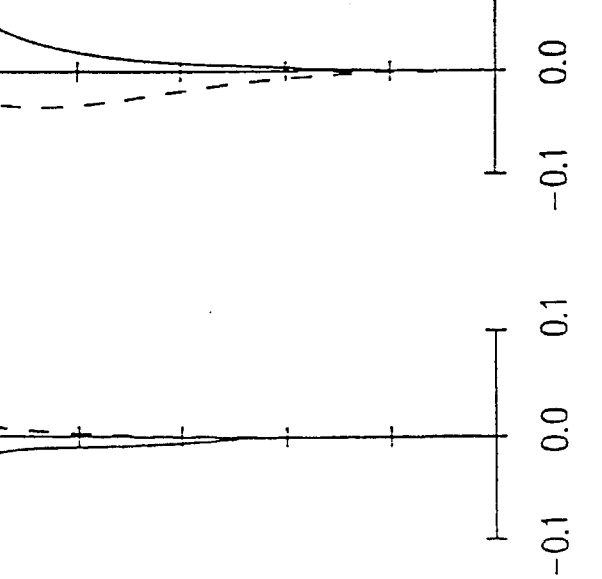

FIGS. 9A to 1le show aberrations at the wide angle end, the standard position, and the telephoto end of the aspherical zoom lens for the third specific value set of the first example. FIGS. 9A, 9B, 9C, 9D, and 9E show the spherical aberration; the astigmatism; the distortion; the chromatic aberration on axis; and the chromatic aberration of magnification, respectively, at the wide angle end. FIGS. 10A, 10B, 10C, 10D, and 10E show the respective aberrations at the standard position. FIGS. 11A, 11B, 11C, 11D, and 11E show the respective aberrations at the telephoto end. From these figures above, it is found that the zoom lens in this example exhibits excellent optical performance.

Next, a fourth specific value set which satisfies the conditions of the first example is shown in Table 15.

TABLE 15

| Lens group | i of i-th face | r | d | n | v |
|---|---|---|---|---|---|
| 1 | 1 | 23.884 | 0.90 | 1.80518 | 25.4 |
|  | 2 | 14.144 | 4.80 | 1.58913 | 61.0 |
|  | 3 | −77.094 | 0.10 |  |  |
|  | 4 | 12.762 | 2.20 | 1.60311 | 60.7 |
|  | 5 | 21.080 | Variable |  |  |
| 2 | 6 | 21.141 | 0.60 | 1.77250 | 49.6 |
|  | 7 | 4.423 | 2.30 |  |  |
|  | 8 | −5.477 | 0.70 | 1.66547 | 55.2 |
|  | 9 | 6.011 | 2.00 | 1.84666 | 23.9 |
|  | 10 | 301.442 | Variable |  |  |
| 3 | 11 | 16.434 | 1.65 | 1.51450 | 63.1 |
|  | 12 | −34.704 | Variable |  |  |
| 4 | 13 | −27.770 | 0.60 | 1.84666 | 23.9 |
|  | 14 | 25.058 | 1.90 | 1.51450 | 63.1 |
|  | 15 | −9.832 | 0.10 |  |  |
|  | 16 | 14.416 | 2.80 | 1.48749 | 66.0 |
|  | 17 | −12.687 | Variable |  |  |
| 5 | 18 | ∞ | 10.00 | 1.58913 | 61.0 |
| 6 | 19 | ∞ | 3.20 | 1.51633 | 64.1 |
|  | 20 | ∞ | — |  |  |

Similarly, the eleventh, the twelfth, and the fifteenth faces are aspherical, and the aspherical coefficients are shown in Table 16 below.

TABLE 16

| i of i-th face | 11 | 12 | 15 |
|---|---|---|---|
| K | 2.37688E-1 | 0.00000 | −2.60353 |
| D | −7.10397E-5 | 2.29070E-4 | −1.53658E-4 |
| E | −3.23571E-5 | −3.82012E-5 | 5.84342E-6 |
| F | −1.31704E-7 | 2.45071E-7 | −2.54758E-8 |
| G | 2.08361E-8 | 3.19970E-9 | 1.10575E-9 |

Table 17 shows the values of the air space variable by zooming which are obtained when the object is disposed at a distance of 2 m measured from the end of the zoom lens.

TABLE 17

|  | Wide angle | Standard | Telephoto |
|---|---|---|---|
| f | 3.746 | 18.988 | 37.183 |
| F/NO | 1.811 | 2.205 | 2.099 |
| d5 | 0.700 | 9.367 | 11.771 |
| d10 | 11.948 | 3.281 | 2.478 |
| d12 | 4.742 | 2.081 | 4.104 |
| d17 | 1.008 | 3.669 | 1.646 |

The conditions for parameters (1) to (9) for the fourth specific value set of the first example are shown in Table 18, below.

Table 18

(1) f1/fW=5.84

(2) |f2|/fW=1.04

(3) f3/fW=5.85

(4) f4/fW=3.13

(5) BF/fW=3.1 to 3.8

(6) d12/f4=0.16 to 0.19

(7) r11/f3=0.75

(8) |r13|/f4=2.37

(9) |r17|/f4=1.11

FIGS. 12A to 14E show aberrations at the wide angle end, the standard position, and the telephoto end of the aspherical zoom lens for the fourth specific value set of the first example. FIGS. 12A, 12B, 12C, 12D, and 12E show the spherical aberration; the astigmatism; the distortion; the chromatic aberration on axis; and the chromatic aberration of magnification, respectively, at the wide angle end. FIGS. 13A, 13B, 13C, 13D, and 13E show the respective aberrations at the standard position. FIGS. 14A, 14B, 14C, 14D, and 14E show the respective aberrations at the telephoto end. From these figures above, it is found that the zoom lens in this example exhibits excellent optical performance.

EXAMPLE 2

FIG. 15 is a view showing the structure of an aspherical zoom lens 110 in a second example according to the invention. As is shown in FIG. 15, the zoom lens 110 includes a first lens group 1, a second lens group 2, a third lens group 3, a fourth lens group 4, a color separation optical system 5, and a flat plate 6 which is optically equivalent to a quartz crystal filter, a face plate of an imaging device, and the like. The reference numeral 7 denotes an image plane.

Respective lens faces are referred to as first to seventeenth faces which are numbered from the side on which an object to be imaged is located. In FIG. 15, the radius of curvature of the i-th face is represented by ri. Similarly, thicknesses of respective lenses, air spaces between adjacent lenses, the thickness of the color separation optical system 5, and the thickness of the flat plate 6 are represented by di numbered from the side on which the object to be imaged is located.

The operation of the zoom lens 110 having the above-described arrangement is described below. The first lens group 1 is fixed at a predetermined position relative to the image plane 7. The first lens group 1 has a positive refractive power and an image forming function. The second lens group 2 has a negative refractive power. The second lens group 2 is movable on an optical axis so as to have a magnification changing function. The third lens group 3 is fixed, and has an aspherical lens having a positive refractive power, so as to have a light converging function. The fourth lens group 4 has a positive refractive power. The fourth lens group 4 is movable on the optical axis so as to make focusing adjustments, and includes an aspherical lens. A relatively large air space is provided between the third and the fourth lens groups 3 and 4.

When viewed sequentially from one side of the object, the first lens group 1 includes a cemented doublet 101 and a meniscus lens 102 having a positive refractive power. The cemented doublet 101 may include a negative lens and a positive lens. The second lens group 2 includes a meniscus lens 103 having a negative refractive power and a cemented doublet 104. The cemented doublet 104 may include a double concave lens and a positive lens. The third lens group 3 includes a single lens 105 having at least one aspherical face. The fourth lens group 4 includes a cemented doublet 106 and one positive lens 107. In the fourth lens group 4, at least one of the lenses has at least one aspherical face.

In the second example, the first lens group 1 includes a lens having at least one aspherical face.

By using a lens having at least one aspherical face in the first lens group aspherical, it is possible to correct the aberration more effectively. In the first example, the advantages of the invention due to the use of the cemented doublet in the fourth lens group will be described. If three single lenses are used in the fourth lens group, there occurs problems with the inclination of the lens, but there exist advantages in that the design can be performed more desirably, and the correction of aberration can be performed more easily.

In this example, by using a lens having an aspherical face in the first lens group, sufficient correction of the aberration can be realized while the cemented doublet is used in the fourth lens group. Especially, the first lens group is closest to the object, and has a larger diameter. Accordingly, if the aspherical lens is used in the first lens group, it becomes possible to enhance the performance at the telephoto end.

The case where the first face (i.e., the face of the cemented doublet 101 on the object side) is aspherical is described as a fifth specific value set. The case where the third face (i.e., the face of the cemented doublet 101 on the side of the image plane 7) is aspherical is described as a sixth specific value set. The case where the fourth face is aspherical is described as a seventh specific value set. Note the conditions on the refractive power of each lens group, and the lens type and contour of each lens group for making the zoom lens 110 compact are the same as those in the first example.

First, the fifth specific value set is shown in Table 19.

TABLE 19

| Lens group | i of i-th face | r | d | n | ν |
|---|---|---|---|---|---|
| 1 | 1 | 27.440 | 0.90 | 1.80518 | 25.4 |
|  | 2 | 16.601 | 5.40 | 1.58913 | 61.2 |
|  | 3 | −109.514 | 0.20 |  |  |
|  | 4 | 15.771 | 2.30 | 1.60311 | 60.7 |
|  | 5 | 25.770 | Variable |  |  |
| 2 | 6 | 21.035 | 0.60 | 1.77250 | 49.6 |
|  | 7 | 5.242 | 2.80 |  |  |
|  | 8 | −6.759 | 0.80 | 1.66547 | 55.2 |
|  | 9 | 7.356 | 2.05 | 1.84666 | 23.9 |
|  | 10 | ∞ | Variable |  |  |
| 3 | 1 | 19.122 | 1.98 | 1.51450 | 63.1 |
|  | 2 | −39.494 | Variable |  |  |
| 4 | 3 | −17.936 | 0.60 | 1.84666 | 23.9 |
|  | 4 | 74.639 | 2.21 | 1.51450 | 63.1 |
|  | 5 | −11.866 | 0.10 |  |  |
|  | 6 | 21.274 | 3.62 | 1.48749 | 70.2 |

TABLE 19-continued

| Lens group | i of i-th face | r | d | n | ν |
|---|---|---|---|---|---|
|  | 7 | −10.288 | Variable |  |  |
| 5 | 8 | ∞ | 14.00 | 1.58913 | 61.0 |
| 6 | 9 | ∞ | 3.90 | 1.51633 | 64.1 |
|  | 10 | ∞ | — |  |  |

The first, the eleventh, the twelfth, and the fifteenth faces are aspherical, and the aspherical coefficients are shown in Table 20 below.

TABLE 20

| i of i-th face | 1 | 11 | 12 | 15 |
|---|---|---|---|---|
| K | 0.00000 | 2.50876 | 0.00000 | −3.03824 |
| D | −5.02513E-8 | −1.11214E-4 | −7.09184E-6 | 2.19980E-5 |
| E | −2.72954E-9 | −8.60063E-6 | −1.08469E-5 | 4.84147E-6 |
| F | 4.14093E-11 | 1.47214E-8 | 8.22637E-8 | 4.88427E-8 |
| G | −1.97844E-13 | −1.35784E-9 | −2.21015E-9 | −5.87663E-10 |

Table 21 shows values of the air space variable by zooming which are obtained when the object is disposed at a distance of 2 m measured from the end of the zoom lens.

TABLE 21

|  | Wide angle | Standard | Telephoto |
|---|---|---|---|
| f | 4.509 | 23.114 | 44.798 |
| F/NO | 1.653 | 1.979 | 2.215 |
| d5 | 0.700 | 11.750 | 14.791 |
| d10 | 16.743 | 5.693 | 2.652 |
| d12 | 5.145 | 1.834 | 4.207 |
| d17 | 1.010 | 4.312 | 1.949 |

The conditions for parameters (1) to (9) for the fifth specific value set are shown in Table 22, below.

Table 22

(1) f1/fW=5.97

(2) f2/fW=1.10

(3) f3/fW=5.62

(4) f4/fW=3.17

(5) BF/fW=3.20 to 4.00

(6) d12/f4=0.11 to 0.36

(7) r11/f3=0.76

(8) |r13|/f4=1.25

(9) |r17|/f4=0.64

FIGS. 16A to 18E show aberrations at the wide angle end, the standard position, and the telephoto end of the aspherical zoom lens for the fifth specific value set of the second example. FIGS. 16A, 16B, 16C, 16D, and 16E show the spherical aberration; the astigmatism; the distortion; the chromatic aberration on axis; and the chromatic aberration of magnification, respectively, at the wide angle end. FIGS. 17A, 17B, 17C, 17D, and 17E show the respective aberrations at the standard position. FIGS. 18A, 18B, 18C, 18D, and 18E show the respective aberrations at the telephoto end. From these figures above, it is found that the zoom lens in this example exhibits excellent optical performance.

Next, the sixth specific value set is shown in Table 23.

TABLE 23

| Lens group | i of i-th face | r | d | n | v |
|---|---|---|---|---|---|
| 1 | 1 | 24.530 | 1.00 | 1.80518 | 25.4 |
|  | 2 | 13.759 | 5.00 | 1.60602 | 57.4 |
|  | 3 | 349.589 | 0.10 |  |  |
|  | 4 | 15.711 | 2.80 | 1.60738 | 56.9 |
|  | 5 | 72.893 | Variable |  |  |
| 2 | 6 | 21.082 | 0.60 | 1.77250 | 49.6 |
|  | 7 | 4.444 | 2.30 |  |  |
|  | 8 | −5.566 | 0.70 | 1.66547 | 55.2 |
|  | 9 | 5.566 | 2.00 | 1.79925 | 24.5 |
|  | 10 | ∞ | Variable |  |  |
| 3 | 11 | 12.414 | 1.65 | 1.51450 | 63.1 |
|  | 12 | ∞ | Variable |  |  |
| 4 | 13 | −27.781 | 0.60 | 1.84666 | 23.9 |
|  | 14 | 23.388 | 2.30 | 1.51450 | 63.1 |
|  | 15 | −13.163 | 0.10 |  |  |
|  | 16 | 16.664 | 3.30 | 1.48749 | 70.2 |
|  | 17 | −9.105 | Variable |  |  |
| 5 | 18 | ∞ | 12.00 | 1.58913 | 61.0 |
| 6 | 19 | ∞ | 3.70 | 1.51633 | 64.1 |
|  | 20 | ∞ | — |  |  |

The third, the eleventh, the twelfth, and the fifteenth faces are aspherical, and the aspherical coefficients are shown in Table 24 below.

TABLE 24

| i of i-th face | 3 | 11 | 12 | 15 |
|---|---|---|---|---|
| K | 0.00000 | 2.73356E-1 | 0.00000 | −2.60011 |
| D | 9.54985E-7 | 1.67999E-4 | 5.30255E-4 | 1.64105E-4 |
| E | 2.44422E-9 | −2.38384E-7 | −8.79581E-6 | 8.86819E-6 |
| F | −1.35287E-10 | −6.98826E-7 | −2.57522E-7 | 3.66126E-8 |
| G | 7.01835E-13 | 1.68621E-8 | 3.82254E-9 | 1.63074E-9 |

Table 25 shows the values of the air space variable by zooming which are obtained when the object is disposed at a distance of 2 m measured from the end of the zoom lens.

TABLE 25

|  | Wide angle | Standard | Telephoto |
|---|---|---|---|
| f | 3.925 | 20.429 | 38.906 |
| F/NO | 1.650 | 1.978 | 2.231 |
| d5 | 0.700 | 9.346 | 11.771 |
| d10 | 13.548 | 4.902 | 2.478 |
| d12 | 4.742 | 1.661 | 3.978 |
| d17 | 1.008 | 4.089 | 1.772 |

The conditions for parameters (1) to (9) for the sixth specific value set are shown in Table 26, below.

Table 26

(1) f1/fW=5.57

(2) |f2|/fW=1.00

(3) f3/fW=6.15

(4) f4/fW=3.06

(5) BF/fW=3.30 to 4.14

(6) d12/f4=0.12 to 0.40

(7) r11/f3=0.52

(8) |r13|/f4=2.31

(9) |r17|/f4=0.76

FIGS. 19A to 21E show aberrations at the wide angle end, the standard position, and the telephoto end of the aspherical zoom lens for the sixth specific value set of the second example. FIGS. 19A, 19B, 19C, 19D, and 19E show the spherical aberration; the astigmatism; the distortion; the chromatic aberration on axis; and the chromatic aberration of magnification, respectively, at the wide angle end. FIGS. 20A, 20B, 20C, 20D, and 20E show the respective aberrations at the standard position. FIGS. 21A, 21B, 21C, 21D, and 21E show the respective aberrations at the telephoto end. From these figures above, it is found that the zoom lens in this example exhibits excellent optical performance.

Next, the seventh specific value set is shown in Table 27.

TABLE 27

| Lens group | i of i-th face | r | d | n | v |
|---|---|---|---|---|---|
| 1 | 1 | 28.398 | 1.15 | 1.80518 | 25.4 |
|  | 2 | 17.108 | 6.35 | 1.58913 | 61.0 |
|  | 3 | −110.923 | 0.23 |  |  |
|  | 4 | 16.083 | 2.54 | 1.60311 | 60.7 |
|  | 5 | 26.196 | Variable |  |  |
| 2 | 6 | 19.447 | 0.75 | 1.77250 | 49.6 |
|  | 7 | 5.133 | 2.88 |  |  |
|  | 8 | −6.682 | 0.85 | 1.66547 | 55.2 |
|  | 9 | 7.365 | 2.31 | 1.84666 | 23.9 |
|  | 10 | −1478.284 | Variable |  |  |
| 3 | 11 | 20.776 | 1.65 | 1.51450 | 63.1 |
|  | 12 | −39.125 | Variable |  |  |
| 4 | 13 | −17.927 | 0.69 | 1.84666 | 23.9 |
|  | 14 | 93.632 | 2.25 | 1.51450 | 63.1 |
|  | 15 | −12.155 | 0.12 |  |  |
|  | 16 | 21.430 | 3.69 | 1.48749 | 66.0 |
|  | 17 | −10.544 | Variable |  |  |
| 5 | 18 | ∞ | 13.85 | 1.58913 | 61.0 |
| 6 | 19 | ∞ | 4.30 | 1.51633 | 64.1 |
|  | 20 | ∞ | — |  |  |

The fourth, the eleventh, the twelfth, and the fifteenth faces are aspherical, and the aspherical coefficients are shown in Table 28 below.

TABLE 28

| i of i-th face | 4 | 11 | 12 | 15 |
|---|---|---|---|---|
| K | 0.00000 | 2.50876 | 0.00000 | −3.03824 |
| D | 2.01006E-7 | −1.44146E-4 | −5.29409E-5 | 2.09596E-5 |
| E | −1.00315E-8 | −8.76261E-6 | −1.05135E-5 | 5.79156E-6 |
| F | 2.21154E-10 | 1.27800E-8 | 7.14152E-8 | −5.48040E-8 |
| G | −1.63822E-12 | −1.13210E-9 | −1.84271E-9 | 1.47771E-9 |

Table 29 shows the values of the air space variable by zooming which are obtained when the object is disposed at a distance of 2 m measured from the end of the zoom lens.

TABLE 29

|  | Wide angle | Standard | Telephoto |
|---|---|---|---|
| f | 4.434 | 23.735 | 45.793 |
| F/NO | 1.644 | 1.964 | 2.203 |
| d5 | 0.300 | 11.860 | 14.825 |
| d10 | 17.622 | 6.062 | 3.097 |
| d12 | 5.472 | 2.085 | 4.368 |
| d17 | 1.036 | 4.422 | 2.140 |

The conditions for parameters (1) to (9) for the seventh specific value set are shown in Table 30, below.

Table 30

(1) f1/fW=6.25

(2) f2/fW=1.12

(3) f3/fW=6.09

(4) f4/fW=3.29

(5) BF/fW=3.35 to 4.19

(6) d12/f4=0.12 to 0.38

(7) r11/f3=0.85

(8) |r13|/f4=1.90

(9) |r17|/f4=0.62

FIGS. 22A to 24E show aberrations at the wide angle end, the standard position, and the telephoto end of the aspherical zoom lens for the seventh specific value set of the second example. FIGS. 22A, 22B, 22C, 22D, and 22E show the spherical aberration; the astigmatism; the distortion; the chromatic aberration on axis; and the chromatic aberration of magnification, respectively, at the wide angle end. FIGS. 23A, 23B, 23C, 23D, and 23E show the respective aberrations at the standard position. FIGS. 24A, 24B, 24C, 24D, and 24E show the respective aberrations at the telephoto end. From these figures above, it is found that the zoom lens in this example exhibits excellent optical performance.

Next, the case where the first lens group 1 has two aspherical faces is described as an eighth specific value set as shown in Table 31. In this case, the first face (the cemented doublet 101) and the third face (the cemented doublet 101) are aspherical.

TABLE 31

| Lens group | i of i-th face | r | d | n | v |
|---|---|---|---|---|---|
| 1 | 1 | 24.612 | 1.00 | 1.80518 | 25.4 |
|  | 2 | 14.827 | 5.50 | 1.58913 | 61.0 |
|  | 3 | −96.133 | 0.20 |  |  |
|  | 4 | 13.939 | 2.20 | 1.60311 | 60.7 |
|  | 5 | 22.703 | Variable |  |  |
| 2 | 6 | 16.854 | 0.65 | 1.77250 | 49.6 |
|  | 7 | 4.449 | 2.50 |  |  |
|  | 8 | −5.791 | 0.74 | 1.66547 | 55.2 |
|  | 9 | 6.383 | 2.00 | 1.84666 | 23.9 |
|  | 10 | −1281.180 | Variable |  |  |
| 3 | 11 | 18.006 | 1.75 | 1.51450 | 63.1 |
|  | 12 | −33.908 | Variable |  |  |
| 4 | 13 | −15.537 | 0.60 | 1.84666 | 23.9 |
|  | 14 | 81.148 | 1.95 | 1.51450 | 63.1 |
|  | 15 | −10.534 | 0.10 |  |  |
|  | 16 | 18.573 | 3.20 | 1.48749 | 66.0 |
|  | 17 | −9.138 | Variable |  |  |
| 5 | 18 | ∞ | 12.00 | 1.58913 | 61.0 |
| 6 | 19 | ∞ | 3.70 | 1.51633 | 64.1 |
|  | 20 | ∞ | — |  |  |

The first, the third, the eleventh, the twelfth, and the fifteenth faces are aspherical, and the aspherical coefficients are shown in Table 32 below.

TABLE 32

| i of i-th face | 1 | 3 | 11 | 12 | 15 |
|---|---|---|---|---|---|
| K | 0.00000 | 0.00000 | −2.50876 | 0.00000 | −3.03824 |
| D | 4.88936E-7 | 3.58977E-7 | −2.21435E-4 | −8.13270E-5 | 3.21978E-5 |
| E | −1.46153E-8 | −7.69727E-9 | −1.79214E-5 | −2.15024E-5 | 1.18450E-5 |
| F | 1.60152E-10 | −3.72457E-11 | 3.47990E-8 | 1.94455E-7 | −1.49227E-7 |
| G | −6.67139E-13 | 1.24283E-12 | −4.10409E-9 | −6.68018E-9 | 5.35696E-9 |

Table 33 shows the values of the air space variable by zooming which are obtained when the object is disposed at a distance of 2 m measured from the end of the zoom lens.

TABLE 33

|  | Wide angle | Standard | Telephoto |
|---|---|---|---|
| f | 4.042 | 20.351 | 40.024 |
| F/NO | 1.652 | 1.968 | 2.248 |
| d5 | 0.700 | 10.234 | 12.877 |
| d10 | 14.831 | 5.297 | 2.653 |
| d12 | 4.319 | 1.822 | 3.884 |
| d17 | 1.008 | 3.818 | 1.756 |

The conditions for parameters (1) to (9) for the eighth specific value set are shown in Table 34, below.

Table 34

(1) f1/fW=5.95

(2) |f2|/fW=1.06

(3) f3/fW=5.72

(4) f4/fW=3.13

(5) BF/fW=3.22 to 3.97

(6) d12/f4=0.13 to 0.38

(7) r11/f3=0.73

(8) |r13|/f4=1.23

(9) |r17|/f4=0.72

FIGS. 25A to 27E show aberrations at the wide angle end, the standard position, and the telephoto end of the aspherical zoom lens for the eighth specific value set of the second example. FIGS. 25A, 25B, 25C, 25D, and 25E show the spherical aberration; the astigmatism; the distortion; the chromatic aberration on axis; and the chromatic aberration of magnification, respectively, at the wide angle end. FIGS. 26A, 26B, 26C, 26D, and 26E show the respective aberrations at the standard position. FIGS. 27A, 27B, 27C, 27D, and 27E show the respective aberrations at the telephoto end. From these figures above, it is found that the zoom lens in this example exhibits excellent optical performance.

EXAMPLE 3

FIG. 28 is a view showing the structure of an aspherical zoom lens 120 in a third example according to the invention. As is shown in FIG. 28, the zoom lens 120 includes a first lens group 1, a second lens group 2, a third lens group 3, a fourth lens group 4, a color separation optical system 5, and a flat plate 6 which is optically equivalent to a quartz crystal filter, a face plate of an imaging device, and the like. The reference numeral 7 denotes an image plane.

Respective lens faces are referred to as first to seventeenth faces which are numbered from the side on which an object to be imaged is located. In FIG. 28, the radius of curvature of the i-th face is represented by ri. Similarly, thicknesses of respective lenses, air spaces between adjacent lenses, the thickness of the color separation optical system 5, and the thickness of the flat plate 6 are represented by di numbered from the side on which the object to be imaged is located.

The operation of the zoom lens 120 having the above-described arrangement is described below. The first lens group 1 is fixed at a predetermined position relative to the image plane 7. The first lens group 1 has a positive refractive power and an image forming function. The second lens group 2 has a negative refractive power. The second lens group 2 is movable on an optical axis so as to have a magnification changing function. The third lens group 3 is fixed, and has an aspherical lens having a positive refractive power, so as to have a light converging function. The fourth lens group 4 has a positive refractive power. The fourth lens group 4 is movable on the optical axis so as to make focusing adjustments, and includes an aspherical lens. A relatively large air space is provided between the third and the fourth lens groups 3 and 4.

When viewed sequentially from the object side, the first lens group 1 includes a cemented doublet 101 and a meniscus lens 102 having a positive refractive power. The cemented doublet 101 may include a negative lens and a positive lens. The second lens group 2 includes a meniscus lens 103 having a negative refractive power and a cemented doublet 104. The cemented doublet 104 may include a double concave lens and a positive lens. The third lens group 3 includes a single lens 105 having at least one aspherical face. The fourth lens group 4 includes a cemented doublet 106 and one positive lens 107. In the fourth lens group 4, at least one of the lenses has at least one aspherical face.

In the third example, the second lens group 2 includes a lens having at least one aspherical face. The advantages due to the use of an aspherical lens in the second lens group are the same as those described in the second example. Since the second lens group has a relatively small lens aperture, the process for making the face aspherical can be easily performed, so that the production cost can be reduced, as compared with the case where an aspherical lens is used in the first lens group.

The case where the seventh face (the meniscus lens 103), and the eighth face (the double-convex lens portion of the cemented doublet 104) are aspherical is described as a ninth specific value set. The case where the eighth face is aspherical is described as a tenth specific value set. Note that the conditions on refractive power of each lens group, and the lens type and contour of each lens group for making the zoom lens 120 compact are the same as those in the first and second examples.

First, the ninth specific value set is shown in Table 35.

TABLE 35

| Lens group | i of i-th face | r | d | n | v |
|---|---|---|---|---|---|
| 1 | 1 | 26.827 | 1.00 | 1.80518 | 25.4 |
|  | 2 | 15.536 | 5.30 | 1.58913 | 61.2 |
|  | 3 | −80.110 | 0.20 |  |  |
|  | 4 | 14.000 | 2.50 | 1.60311 | 60.7 |

TABLE 35-continued

| Lens group | i of i-th face | r | d | n | v |
|---|---|---|---|---|---|
|  | 5 | 23.518 | Variable |  |  |
| 2 | 6 | 21.471 | 0.65 | 1.77250 | 49.6 |
|  | 7 | 4.637 | 2.50 |  |  |
|  | 8 | −5.977 | 0.74 | 1.66547 | 55.2 |
|  | 9 | 6.685 | 2.20 | 1.84666 | 23.9 |
|  | 10 | −1164.691 | Variable |  |  |
| 3 | 11 | 14.789 | 2.07 | 1.51450 | 63.1 |
|  | 12 | −54.610 | Variable |  |  |
| 4 | 13 | −16.850 | 0.60 | 1.84666 | 23.9 |
|  | 14 | 50.957 | 2.10 | 1.51450 | 63.1 |
|  | 15 | −10.979 | 0.10 |  |  |
|  | 16 | 18.955 | 3.20 | 1.48749 | 70.2 |
|  | 17 | −9.078 | Variable |  |  |
| 5 | 18 | ∞ | 12.00 | 1.58913 | 61.0 |
| 6 | 19 | ∞ | 3.70 | 1.51633 | 64.1 |
|  | 20 | ∞ | — |  |  |

The seventh, the eighth, the eleventh, the twelfth, and the fifteenth faces are aspherical, and the aspherical coefficients are shown in Table 36 below.

TABLE 36

| i of i-th face | 7 | 8 | 11 | 12 | 15 |
|---|---|---|---|---|---|
| K | 0.00000 | 0.00000 | −2.50876 | 0.00000 | −3.03824 |
| D | −1.09986E-4 | 5.30864E-5 | 7.27317E-5 | 2.04767E-4 | 5.78843E-5 |
| E | 4.94764E-5 | 2.80551E-6 | −1.63205E-5 | −2.13212E-5 | 1.01142E-5 |
| F | −8.01788E-6 | −2.24693E-6 | 3.47990E-8 | 1.94458E-7 | 3.78681E-9 |
| G | 4.84725E-7 | 1.49591E-7 | −4.10409E-9 | −6.68018E-9 | 2.15060E-9 |

Table 37 shows the values of the air space variable by zooming which are obtained when the object is disposed at a distance of 2 m measured from the end of the zoom lens.

TABLE 37

|  | Wide angle | Standard | Telephoto |
|---|---|---|---|
| f | 4.010 | 20.178 | 40.150 |
| F/NO | 1.665 | 1.966 | 2.249 |
| d5 | 0.700 | 10.245 | 12.150 |
| d10 | 13.084 | 3.538 | 0.905 |
| d12 | 4.632 | 1.825 | 3.887 |
| d17 | 1.008 | 3.823 | 1.761 |

The conditions for parameters (1) to (9) for the ninth specific value set are shown in Table 38, below.

Table 38

(1) f1/fW=5.97

(2) |f2|/fW=1.07

(3) f3/fW=5.70

(4) f4/fW=3.16

(5) BF/fW=3.24 to 4.00

(6) d12/f4=0.13 to 0.37

(7) r11/f3=0.65

(8) |r13|/f4=1.33

(9) |r17|/f4=0.72

FIGS. 29A to 31E show aberrations at the wide angle end, the standard position, and the telephoto end of the aspherical zoom lens for the ninth specific value set of the third example. FIGS. 29A, 29B, 29C, 29D, and 29E show the spherical aberration; the astigmatism; the distortion; the chromatic aberration on axis; and the chromatic aberration of magnification, respectively, at the wide angle end. FIGS. 30A, 30B, 30C, 30D, and 30E show the respective aberrations at the standard position. FIGS. 31A, 31B, 31C, 31D, and 31E show the respective aberrations at the telephoto end. From these figures above, it is found that the zoom lens in this example exhibits excellent optical performance.

Next, the tenth specific value set is shown in Table 39.

TABLE 39

| Lens group | i of i-th face | r | d | n | v |
|---|---|---|---|---|---|
| 1 | 1 | 27.787 | 0.90 | 1.80518 | 25.4 |
|  | 2 | 16.724 | 5.40 | 1.58913 | 61.0 |
|  | 3 | −104.467 | 0.20 |  |  |
|  | 4 | 15.958 | 2.30 | 1.60311 | 60.7 |
|  | 5 | 26.447 | Variable |  |  |
| 2 | 6 | 21.087 | 0.60 | 1.77250 | 49.6 |
|  | 7 | 5.246 | 2.80 |  |  |
|  | 8 | −6.758 | 0.80 | 1.66547 | 55.2 |
|  | 9 | 7.358 | 2.05 | 1.84666 | 23.9 |
|  | 10 | ∞ | Variable |  |  |
| 3 | 11 | 19.833 | 1.90 | 1.51450 | 63.1 |
|  | 12 | −33.125 | Variable |  |  |
| 4 | 13 | −16.905 | 0.60 | 1.84666 | 23.9 |
|  | 14 | 118.008 | 1.95 | 1.51450 | 63.1 |
|  | 15 | −11.750 | 0.10 |  |  |
|  | 16 | 21.859 | 3.55 | 1.48749 | 66.0 |
|  | 17 | −10.215 | Variable |  |  |
| 5 | 18 | ∞ | 14.00 | 1.58913 | 61.0 |
| 6 | 19 | ∞ | 3.90 | 1.51633 | 64.1 |
|  | 20 | ∞ | — |  |  |

The eighth, the eleventh, the twelfth, and the fifteenth faces are aspherical, and the aspherical coefficients are shown in Table 40 below.

TABLE 40

| i of i-th face | 8 | 11 | 12 | 15 |
|---|---|---|---|---|
| K | 0.00000 | −2.50876 | 0.00000 | −3.03824 |
| D | 4.67297E-5 | −1.27140E-4 | −3.73008E-5 | 2.76636E-5 |
| E | −9.17294E-6 | −8.01412E-6 | −9.66914E-6 | 5.38590E-6 |
| F | 5.80369E-7 | −1.18538E-8 | 5.16638E-8 | −1.13503E-8 |
| G | −4.66567E-8 | −1.33157E-9 | −2.16739E-9 | 7.73343E-10 |

Table 41 shows the values of the air space variable by zooming which are obtained when the object is disposed at a distance of 2 m measured from the end of the zoom lens.

TABLE 41

|  | Wide angle | Standard | Telephoto |
|---|---|---|---|
| f | 4.434 | 23.735 | 45.793 |
| F/NO | 1.644 | 1.964 | 2.203 |
| d5 | 0.300 | 11.860 | 14.825 |
| d10 | 17.153 | 5.593 | 1.078 |
| d12 | 5.472 | 2.085 | 4.368 |
| d17 | 1.036 | 4.422 | 2.140 |

The conditions for parameters (1) to (9) for the tenth specific value set are shown in Table 42, below.

Table 42

(1) f1/fW=5.87
(2) |f2|/fW=1.09
(3) f3/fW=5.33
(4) f4/fW=3.20
(5) BF/fW=3.26 to 4.10
(6) d12/f4=0.11 to 0.36
(7) r11/f3=0.81
(8) |r13|/f4=1.16
(9) |r17|/f4=0.70

FIGS. 32A to 34E show aberrations at the wide angle end, the standard position, and the telephoto end of the aspherical zoom lens for the tenth specific value set of the third example. FIGS. 32A, 32B, 32C, 32D, and 32E show the spherical aberration; the astigmatism; the distortion; the chromatic aberration on axis; and the chromatic aberration of magnification, respectively, at the wide angle end. FIGS. 33A, 33B, 33C, 33D, and 33E show the respective aberrations at the standard position. FIGS. 34A, 34B, 34C, 34D, and 34E show the respective aberrations at the telephoto end. From these figures above, it is found that the zoom lens in this example exhibits excellent optical performance.

EXAMPLE 4

FIG. 35 schematically shows a 3-CCD type video camera 300 according to a fourth example of the invention. The video camera 300 includes at least a high-magnification zoom lens 130 (which may be any one of the zoom lenses 100, 110, and 120), a flat plate 30 such as a quartz crystal, an optical system 31 such as a color separation prism, etc., three CCDs 32, a signal processing circuit 33, and a viewfinder 34. The flat plate 30 is an optically equivalent glass plate which is inserted between the last lens face and an image plane (such as a low pass filter, an IR cut filter, a face plate for a CCD, or a color filter). The optical system 31 separates light output from the aspherical zoom lens into respective R, G, and B wavelength bands. The three CCDs 32 convert images in the respective R, G, and B wavelength bands which are separated by the color separation optical system, into pixel signals.

By the use of the aspherical zoom lens 130 according to the invention, it is possible to provide a high-performance video camera with reduced size and weight.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. An aspherical zoom lens comprising sequentially from an object side:

a first lens group which has a positive refractive power and is fixed relative to an image plane;

a second lens group which has a negative refractive power and is movable on an optical axis of the aspherical zoom lens so as to have a magnification changing function;

a third lens group which has a positive refractive power and is fixed relative to the image plane so as to have a light converging function; and a fourth lens group which has a positive refractive power and is movable on the optical axis so that the image plane displaceable in response to travel of the second lens group and movement of the object is fixed at a position spaced by a predetermined distance from a reference face, wherein an air space is provided between the third and the fourth lens groups, and wherein when viewed sequentially from the object side, the first lens group includes a negative lens, a positive lens and a meniscus positive lens, the second lens group includes a meniscus negative lens, a double concave lens and a positive lens, the third lens group includes a single lens having at least one aspherical face and the fourth lens group includes a cemented doublet and a positive lens, at least one of which has at least one aspherical face, and satisfying the following conditions:
(1) $5.0 < f1/fW < 6.3$
(2) $0.9 < |f2|/fW < 1.2$
(3) $5.3 < f3/fW < 6.2$
(4) $3.0 < f4/fW < 3.3$
(5) $3.1 < BF/fW < 4.2$
(6) $0.1 < d12/f4 < 0.4$
(7) $0.5 < r11/f3 < 0.9$
(8) $1.1 < |r13|/f4 < 2.4$
(9) $0.6 < |r17|/f4 < 0.8$ where fW denotes a focal length of the aspherical zoom lens at a wide angle end, fi (I=1, 2, 3, and 4) denotes a focal length of an i-th lens group; BF denotes an air spatial distance from the last lens face to the image plane, a value of BF being variable according to zoom and focus positions; d12 denotes the air space between the third and the fourth lens groups; r11 denotes a radius of curvature of a face of the positive lens of the third lens group, which face confronts the object; r13 denotes a radius of curvature of a face of the cemented doublet of the fourth lens group; and r17 denotes a radius of curvature of a face of the positive lens of the fourth lens group.

2. An aspherical zoom lens according to claim 1, wherein in the first lens group, the negative lens and the positive lens constitute a second cemented doublet, and in the second lens group, the double concave lens and the positive lens constitute a third cemented doublet.

3. An aspherical zoom lens according to claim 1, wherein the third lens group comprises an aspherical single lens with positive refractive power having a convex face confronting the object.

4. An aspherical zoom lens according to claim 1, wherein in the cemented doublet of the fourth lens group, when viewed sequentially from the object side, a negative lens and a positive lens are attached to each other, and the positive lens has a convex face confronting the image plane.

* * * * *